US012755263B2

(12) United States Patent
Kurlas et al.

(10) Patent No.: US 12,755,263 B2
(45) Date of Patent: Oct. 6, 2026

(54) SYSTEM, METHOD, AND COMPUTER PROGRAM PRODUCT FOR OPERATING A GROUP TRANSACTION NETWORK

(71) Applicant: Visa International Service Association, San Francisco, CA (US)

(72) Inventors: Nicholas Bryan Kurlas, New York, NY (US); Nkanyiso Khumalo, Pretoria (CA); Sameer Shiraz Poonja, Dubai (AE)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/044,583

(22) PCT Filed: Sep. 14, 2021

(86) PCT No.: PCT/US2021/050236
§ 371 (c)(1),
(2) Date: Mar. 9, 2023

(87) PCT Pub. No.: WO2022/060714
PCT Pub. Date: Mar. 24, 2022

(65) Prior Publication Data

US 2023/0394458 A1 Dec. 7, 2023

Related U.S. Application Data

(60) Provisional application No. 63/078,788, filed on Sep. 15, 2020.

(51) Int. Cl.
*G06Q 20/22* (2012.01)

(52) U.S. Cl.
CPC ......... *G06Q 20/227* (2013.01); *G06Q 20/223* (2013.01)

(58) Field of Classification Search
CPC .... G06Q 20/227; G06Q 20/223; G06Q 20/02; G06Q 20/3223; G06Q 20/326;
(Continued)

(56) References Cited

U.S. PATENT DOCUMENTS

| | | | | |
|---|---|---|---|---|
| 8,923,827 B2 * | 12/2014 | Wentker | ............ | H04M 15/8355 455/406 |
| 9,886,691 B2 * | 2/2018 | Desai | ................. | G06Q 20/3674 |

(Continued)

FOREIGN PATENT DOCUMENTS

| | | | | |
|---|---|---|---|---|
| EP | 4236197 A2 * | 8/2023 | ............... | G06N 3/09 |
| KR | 20200009408 A | 1/2020 | | |

(Continued)

OTHER PUBLICATIONS

Jain, Rishabn, "System Design: API Gateway+Backend for Frontend(BFF)+Cache Stampede+Circuit Breaker," Apr. 13, 2020 (Year: 2020).*

(Continued)

*Primary Examiner* — James H Miller
(74) *Attorney, Agent, or Firm* — The Webb Law Firm

(57) ABSTRACT

A method for operating a private group transaction network, includes: receiving a group creation request; communicating a group invitation to each of the group members; receiving a plurality of group acceptance messages, one from each of the group members, where each group acceptance message includes an account identifier associated with a payment account of an associated group member, where a group member has a payment account issued by an issuer system different from at least one of the issuer systems of the other group members; generating the private group transaction network; processing an intra-group transfer request by: executing a plurality of pull transfers by pulling the transfer amount from the first and second payment accounts to the (Continued)

group payment account; and executing a single push transfer for the transfer amount by pushing the transfer amount from the group payment account to the third payment account.

15 Claims, 14 Drawing Sheets

(58) Field of Classification Search
CPC .. G06Q 20/363; G06Q 20/385; G06Q 20/389; G06Q 20/405; G06Q 20/102
See application file for complete search history.

(56) References Cited

U.S. PATENT DOCUMENTS

| | | | | | |
|---|---|---|---|---|---|
| 10,789,590 | B2 * | 9/2020 | Tran | H04L 9/3236 | |
| 11,861,619 | B1 * | 1/2024 | Vijayaraghavan | G06Q 20/02 | |
| 2007/0061248 | A1 * | 3/2007 | Shavit | G06Q 40/04 | 705/37 |
| 2015/0032627 | A1 * | 1/2015 | Dill | G06Q 20/40 | 705/44 |
| 2015/0073959 | A1 * | 3/2015 | Connors | G06Q 40/00 | 705/35 |
| 2015/0112871 | A1 * | 4/2015 | Kumnick | G06Q 20/382 | 705/67 |
| 2015/0127547 | A1 * | 5/2015 | Powell | G06Q 20/4016 | 705/67 |
| 2016/0048823 | A1 * | 2/2016 | Wetzel | G06Q 20/29 | 705/39 |
| 2016/0321625 | A1 * | 11/2016 | Gilliam, III | G06Q 20/10 | |
| 2017/0221066 | A1 * | 8/2017 | Ledford | G06Q 20/4016 | |
| 2017/0352019 | A1 * | 12/2017 | Li | G06Q 20/384 | |
| 2019/0180308 | A1 * | 6/2019 | Ziedan | G06Q 30/0216 | |
| 2020/0111157 | A1 * | 4/2020 | Kesiboyana | G06Q 40/03 | |
| 2020/0127843 | A1 * | 4/2020 | Webster | H04L 63/102 | |
| 2020/0143466 | A1 * | 5/2020 | Wu | H04L 9/3239 | |
| 2020/0226677 | A1 * | 7/2020 | Dhawan | H04L 9/50 | |
| 2021/0027330 | A1 * | 1/2021 | Marks | G06Q 30/0234 | |
| 2023/0394458 | A1 * | 12/2023 | Kurlas | G06Q 20/227 | |

FOREIGN PATENT DOCUMENTS

| | | | | |
|---|---|---|---|---|
| WO | WO-2015035417 | A1 * | 3/2015 | G06Q 40/00 |
| WO | WO-2017209831 | A1 * | 12/2017 | G06Q 10/40 |
| WO | 2018020387 | A1 | 2/2018 | |
| WO | WO-2019117810 | A1 * | 6/2019 | G06Q 10/40 |
| WO | WO-2019118683 | A1 * | 6/2019 | G06Q 20/14 |

OTHER PUBLICATIONS

Walpita, Priyal, "Software Architecture Patterns—Layered Architecture," Jul. 9, 2019 (Year: 2019).*
Bradley, et al, "Getting Started with Enterprise Blockchain, A Guide to Design and Development," 2019 (Year: 2019).*
Jain, Rishban, "System Design: API Gateway + Backend for Frontend(BFF) + Cache Stampede + Circuit Breaker," Apr. 13, 2020 (Year: 2020).*
Walpita, Priyal, "Software Architecture Patters—Layered Architecture," Jul. 9, 2019 (Year: 2019).*
Bruene, Jim, "Group Banking Gets an App, A Look at Yodlee's Tandem," Nov. 30, 2013 (Year: 2013).*
Qin, Andy, "How to Build as Escrow Product—Modern Treasury Journal," Jan. 21, 2021 (Year: 2021).*
Jain, Abhilash, "BFF Layer: When It's more than just an API gateway" (Year: 2019).*
Digital Financial Services (Year: 2020).*
Bruene, "Group Banking Gets an App, A Look at Yodlee's Tandem—Finovate", 2013, https://finovate.com/group_banking_gets_an_app_a_look_at_yodlees_tandem/, 11 pages.
Duban, "Yodlee Tandem on Behance", 2019, https://www.behance.net/gallery/82025881/Yodlee-Tandem, 5 pages.
Pazarbasioglu et al., "Digital financial services.", World Bank 54, 2020, pp. 1-54, No. 1.

* cited by examiner

600

| Group Savings Schedule | | | | |
|---|---|---|---|---|
| Date | Group Member | Txn. Type | Txn. Amt. | Group Account Balance |
| 9/1/21 | GM 1 | Contribution | $ 500 | $ 500 |
| 9/1/21 | GM 2 | Contribution | $ 500 | $ 1000 |
| 9/1/21 | GM 3 | Contribution | $ 500 | $ 1500 |
| 9/8/21 | GM 1 | Disbursement | $ 100 | $ 1400 |
| 9/15/21 | GM 2 | Disbursement | $ 100 | $ 1300 |
| 9/22/21 | GM 3 | Disbursement | $ 100 | $ 1200 |
| ⋮ | ⋮ | ⋮ | ⋮ | ⋮ |

FIG. 6

SYSTEM, METHOD, AND COMPUTER PROGRAM PRODUCT FOR OPERATING A GROUP TRANSACTION NETWORK

CROSS REFERENCE TO RELATED APPLICATIONS

This application is the United States national phase of International Application No. PCT/US2021/050236 filed Sep. 14, 2021, and claims priority to U.S. Provisional Patent Application No. 63/078,788, filed Sep. 15, 2020, the disclosures of which are hereby incorporated by reference in their entirety.

BACKGROUND

1. Technical Field

This disclosure relates generally to transaction networks and, in some non-limiting embodiments or aspects, to systems, methods, and computer program products for operating a private group transaction network.

2. Technical Considerations

In many emerging markets around the world, groups of people who know and trust each other manage their money together. Stokvels in South Africa, Chamas in Kenya, and Arisans in Indonesia are real-world examples of groups of people who know and trust each other and manage their money together.

In managing money as a group, it is difficult to provide transparency and accountability. Group members burdened by manual efforts have difficulty acting as a unit while also maintaining individual roles, at least partially because, to date, there have been very few products that have been specifically designed to facilitate group finances and the transactions conducted by those group members.

SUMMARY

According to some non-limiting embodiments or aspects, a method for operating a private group transaction network includes: receiving, with at least one processor, a group creation request to cause generation of a private group transaction network, where the group creation request identifies contact information associated with at least three group members; communicating, with at least one processor, a group invitation to each of the at least three group members; receiving, with at least one processor, a plurality of group acceptance messages, one from each of the at least three group members, where each group acceptance message includes an account identifier associated with a payment account of an associated group member, where the at least three group members include a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generating, with at least one processor, the private group transaction network including the first, second, and third group members, where generating the private group transaction network includes generating a group payment account associated with the private group transaction network, where the group payment account is configured in communication with each of the first, second, and third payment accounts; processing, with at least one processor, an intra-group transfer request between the first and second group members and the third group member for a transfer amount by: executing, with at least one processor, a plurality of pull transfers summing at least to the transfer amount by pulling at least the transfer amount from the first and second payment accounts to the group payment account in separate pull transfers; and executing, with at least one processor, a single push transfer for the transfer amount by pushing the transfer amount from the group payment account to the third payment account.

In some non-limiting embodiments or aspects, the method may further include: generating, with at least one processor, a token for each of the received account identifiers; associating, with at least one processor, each generated token with each associated account identifier; and executing, with at least one processor, the plurality of pull transfers and/or the push transfer using the generated tokens. The method may further include: executing, with at least one processor, a plurality of intra-group transfer requests, each intra-group transfer request executed between at least two of the at least three group members, where the plurality of intra-group transfer requests include a first intra-group transfer request and a second intra-group transfer request; generating, with at least one processor, first transfer data associated with a first intra-group transfer corresponding to the first intra-group transfer request; generating, with at least one processor, second transfer data associated with a second intra-group transfer corresponding to the second intra-group transfer request; and tracking, with at least one processor, the plurality of intra-group transfer requests using a blockchain based on the first transfer data and the second transfer data. Processing the intra-group transfer request may include invoking a smart contract associated with the group. At least two of the first payment account, second payment account, and third payment account may be based out of different countries. The first payment account, second payment account, and third payment account may be personal payment accounts. The intra-group transfer request may include a loan request having loan parameters, where the loan parameters are specified by at least one of the first group member, the second group member, and the third group member.

According to some non-limiting embodiments or aspects, a system for operating a private group transaction network includes at least one processor programmed or configured to: receive a group creation request to cause generation of a private group transaction network, where the group creation request identifies contact information associated with at least three group members; communicate a group invitation to each of the at least three group members; receive a plurality of group acceptance messages, one from each of the at least three group members, where each group acceptance message includes an account identifier associated with a payment account of an associated group member, where the at least three group members include a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network including the first, second, and third group members, where generating the private group transaction network includes generating a group payment account associated with the private group transaction network, where the group payment account is configured in communication with each of the first, second, and third payment accounts; process an intra-group transfer request between the first and second group members and the third group member for a transfer amount by: executing a plurality of pull transfers summing at least to the transfer amount by pulling at least the transfer amount from the first and second payment accounts to the group payment account in separate pull transfers; and executing a single push transfer for the transfer amount by pushing the transfer amount from the group payment account to the third payment account.

In some non-limiting embodiments or aspects, the at least one processor may be programmed or configured to: generate a token for each of the received account identifiers; associate each generated token with each associated account identifier; and execute the plurality of pull transfers and/or the push transfer using the generated tokens. The at least one processor may be programmed or configured to: execute a plurality of intra-group transfer requests, each intra-group transfer request executed between at least two of the at least three group members, where the plurality of intra-group transfer requests include a first intra-group transfer request and a second intra-group transfer request; generate first transfer data associated with a first intra-group transfer corresponding to the first intra-group transfer request; generate second transfer data associated with a second intra-group transfer corresponding to the second intra-group transfer request; and track the plurality of intra-group transfer requests using a blockchain based on the first transfer data and the second transfer data. Processing the intra-group transfer request may include invoking a smart contract associated with the group. At least two of the first payment account, second payment account, and third payment account may be based out of different countries. The first payment account, second payment account, and third payment account may be personal payment accounts. The intra-group transfer request may include a loan request having loan parameters, where the loan parameters are specified by at least one of the first group member, the second group member, and the third group member.

According to some non-limiting embodiments or aspects, a computer program product for operating a private group transaction network includes at least one non-transitory computer-readable medium including program instructions that, when executed by at least one processor, cause the at least one processor to: receive a group creation request to cause generation of a private group transaction network, where the group creation request identifies contact information associated with at least three group members; communicate a group invitation to each of the at least three group members; receive a plurality of group acceptance messages, one from each of the at least three group members, where each group acceptance message includes an account identifier associated with a payment account of an associated group member, where the at least three group members include a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network including the first, second, and third group members, where generating the private group transaction network includes generating a group payment account associated with the private group transaction network, where the group payment account is configured in communication with each of the first, second, and third payment accounts; process an intra-group transfer request between the first and second group members and the third group member for a transfer amount by: executing a plurality of pull transfers summing at least to the transfer amount by pulling at least the transfer amount from the first and second payment accounts to the group payment account in separate pull transfers; and executing a single push transfer for the transfer amount by pushing the transfer amount from the group payment account to the third payment account.

In some non-limiting embodiments or aspects, the program instructions may cause the at least one processor to: generate a token for each of the received account identifiers; associate each generated token with each associated account identifier; and execute the plurality of pull transfers and/or the push transfer using the generated tokens. The program instructions may cause the at least one processor to: execute a plurality of intra-group transfer requests, each intra-group transfer request executed between at least two of the at least three group members, where the plurality of intra-group transfer requests include a first intra-group transfer request and a second intra-group transfer request; generate first transfer data associated with a first intra-group transfer corresponding to the first intra-group transfer request; generate second transfer data associated with a second intra-group transfer corresponding to the second intra-group transfer request; and track the plurality of intra-group transfer requests using a blockchain based on the first transfer data and the second transfer data. Processing the intra-group transfer request may include invoking a smart contract associated with the group. At least two of the first payment account, second payment account, and third payment account may be based out of different countries. The first payment account, second payment account, and third payment account may be personal payment accounts. The intra-group transfer request may include a loan request having loan parameters, where the loan parameters are specified by at least one of the first group member, the second group member, and the third group member.

According to some non-limiting embodiments or aspects, a method for operating a private group transaction network includes: receiving, with at least one processor, a group creation request to cause generation of a private group transaction network, where the group creation request identifies contact information associated with at least three group members; communicating, with at least one processor, a group invitation to each of the at least three group members; receiving, with at least one processor, a plurality of group acceptance messages, one from each of the at least three group members, where each group acceptance message includes an account identifier associated with a payment account of an associated group member, where the at least three group members include a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generating, with at least one processor, the private group transaction network including the first, second, and third group members, where generating the private group transaction network includes generating a group payment account associated with the private group transaction network, where the group payment account is configured in communication with each of the first, second, and third payment accounts; executing, with at least one processor, a group savings protocol by: generating, with at least one processor, a group savings schedule including at least one contribution date on which a contribution amount is pulled from each of the first, second, and third payment accounts to the group payment account and a plurality of disbursement dates including: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, where the first disbursement date, the second disbursement date, and the third disbursement date are different from each other; generating and storing, with at least one processor, a plurality of data entries associated with the group savings schedule, the plurality of data entries including: a contribution data entry including the contribution date, at least one contribution amount, and data associated with the first, second, and third payment accounts; a first disbursement data entry including the first disbursement date, the first disbursement amount, and data associated with the first payment account; a second disbursement data entry including the second disbursement date, the second disbursement amount, and data associated with the second payment account; and a third disbursement data entry including the third disbursement date, the third disbursement amount, and data associated with the third payment account; based on the plurality of data entries, transferring, with at least one processor and based on the at least one contribution date, the at least one contribution amount from each of the first, second, and third payment accounts to the group payment account; processing, with at least one processor, a schedule update event to exchange the first disbursement date in the first disbursement data entry with the second disbursement date in the second disbursement data entry by modifying the first disbursement data entry and the second disbursement data entry; and automatically transferring, with at least one processor and based on the first disbursement date, the second disbursement amount from the group payment account to the second payment account, based on the modified second disbursement data entry.

In some non-limiting embodiments or aspects, the method may further include: transmitting a schedule update request message from a device of the second group member to a device of the first group member, the schedule update request message including a schedule update request corresponding to the schedule update event; and initiating processing of the schedule update event in response to receiving an acceptance message from the device of the first group member, the acceptance message accepting the schedule update request. The method may further include: automatically transferring, with at least one processor and based on the second disbursement date, the first disbursement amount from the group payment account to the first payment account, based on the modified first disbursement data entry. The method may further include tracking the group savings schedule using a blockchain based on the plurality of data entries associated with the group savings schedule. Tracking the group savings schedule using the blockchain may include tracking the schedule update event using the blockchain. At least two of the first payment account, second payment account, and third payment account may be based out of different countries. The first payment account, second payment account, and third payment account may be personal payment accounts. Processing the schedule update event may include invoking a smart contract associated with the group.

According to some non-limiting embodiments or aspects, a system for operating a private group transaction network includes at least one processor programmed or configured to: receive a group creation request to cause generation of a private group transaction network, where the group creation request identifies contact information associated with at least three group members; communicate a group invitation to each of the at least three group members; receive a plurality of group acceptance messages, one from each of the at least three group members, where each group acceptance message includes an account identifier associated with a payment account of an associated group member, where the at least three group members include a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network including the first, second, and third group members, where generating the private group transaction network includes generating a group payment account associated with the private group transaction network, where the group payment account is configured in communication with each of the first, second, and third payment accounts; execute a group savings protocol by: generating a group savings schedule including at least one contribution date on which a contribution amount is pulled from each of the first, second, and third payment accounts to the group payment account and a plurality of disbursement dates including: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, where the first disbursement date, the second disbursement date, and the third disbursement date are different from each other; generating and storing a plurality of data entries associated with the group savings schedule, the plurality of data entries including: a contribution data entry including the contribution date, at least one contribution amount, and data associated with the first, second, and third payment accounts; a first disbursement data entry including the first disbursement date, the first disbursement amount, and data associated with the first payment account; a second disbursement data entry including the second disbursement date, the second disbursement amount, and data associated with the second payment account; and a third disbursement data entry including the third disbursement date, the third disbursement amount, and data associated with the third payment account; based on the plurality of data entries, transferring based on the at least one contribution date, the at least one contribution amount from each of the first, second, and third payment accounts to the group payment account; processing a schedule update event to exchange the first disbursement date in the first disbursement data entry with the second disbursement date in the second disbursement data entry by modifying the first disbursement data entry and the second disbursement data entry; and automatically transferring, based on the first disbursement date, the second disbursement amount from the group payment account to the second payment account, based on the modified second disbursement data entry.

In some non-limiting embodiments or aspects, the at least one processor may be programmed or configured to: transmit a schedule update request message from a device of the second group member to a device of the first group member, the schedule update request message including a schedule update request corresponding to the schedule update event; and initiate processing of the schedule update event in response to receiving an acceptance message from the device of the first group member, the acceptance message accepting the schedule update request. The at least one processor may be programmed or configured to: automatically transfer, based on the second disbursement date, the first disbursement amount from the group payment account to the first payment account, based on the modified first disbursement data entry. The at least one processor may be programmed or configured to: track the group savings schedule using a blockchain based on the plurality of data entries associated with the group savings schedule. Tracking the group savings schedule using the blockchain may include tracking the schedule update event using the blockchain. At least two of the first payment account, second payment account, and third payment account may be based out of different countries. The first payment account, second payment account, and third payment account may be personal payment accounts. Processing the schedule update event may include invoking a smart contract associated with the group.

According to some non-limiting embodiments or aspects, a computer program product for operating a private group transaction network includes at least one non-transitory computer-readable medium including program instructions that, when executed by at least one processor, cause the at least one processor to: receive a group creation request to cause generation of a private group transaction network, where the group creation request identifies contact information associated with at least three group members; communicate a group invitation to each of the at least three group members; receive a plurality of group acceptance messages, one from each of the at least three group members, where each group acceptance message includes an account identifier associated with a payment account of an associated group member, where the at least three group members include a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network including the first, second, and third group members, where generating the private group transaction network includes generating a group payment account associated with the private group transaction network, where the group payment account is configured in communication with each of the first, second, and third payment accounts; execute a group savings protocol by: generating a group savings schedule including at least one contribution date on which a contribution amount is pulled from each of the first, second, and third payment accounts to the group payment account and a plurality of disbursement dates including: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, where the first disbursement date, the second disbursement date, and the third disbursement date are different from each other; generating and storing a plurality of data entries associated with the group savings schedule, the plurality of data entries including: a contribution data entry including the contribution date, at least one contribution amount, and data associated with the first, second, and third payment accounts; a first disbursement data entry including the first disbursement date, the first disbursement amount, and data associated with the first payment account; a second disbursement data entry including the second disbursement date, the second disbursement amount, and data associated with the second payment account; and a third disbursement data entry including the third disbursement date, the third disbursement amount, and data associated with the third payment account; based on the plurality of data entries, transferring based on the at least one contribution date, the at least one contribution amount from each of the first, second, and third payment accounts to the group payment account; processing a schedule update event to exchange the first disbursement date in the first disbursement data entry with the second disbursement date in the second disbursement data entry by modifying the first disbursement data entry and the second disbursement data entry; and automatically transferring, based on the first disbursement date, the second disbursement amount from the group payment account to the second payment account, based on the modified second disbursement data entry.

In some non-limiting embodiments or aspects, the program instructions may cause the at least one processor to: transmit a schedule update request message from a device of the second group member to a device of the first group member, the schedule update request message including a schedule update request corresponding to the schedule update event; and initiate processing of the schedule update event in response to receiving an acceptance message from the device of the first group member, the acceptance message accepting the schedule update request. The program instructions may cause the at least one processor to: automatically transfer, based on the second disbursement date, the first disbursement amount from the group payment account to the first payment account, based on the modified first disbursement data entry. The program instructions may cause the at least one processor to: track the group savings schedule using a blockchain based on the plurality of data entries associated with the group savings schedule. Tracking the group savings schedule using the blockchain may include tracking the schedule update event using the blockchain. At least two of the first payment account, second payment account, and third payment account may be based out of different countries. The first payment account, second payment account, and third payment account may be personal payment accounts. Processing the schedule update event may include invoking a smart contract associated with the group.

Further non-limiting embodiments or aspects are set forth in the following numbered clauses:

Clause 1: A method for operating a private group transaction network, comprising: receiving, with at least one processor, a group creation request to cause generation of a private group transaction network, wherein the group creation request identifies contact information associated with at least three group members; communicating, with at least one processor, a group invitation to each of the at least three group members; receiving, with at least one processor, a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generating, with at least one processor, the private group transaction network comprising the first, second, and third group members, wherein generating the private group transaction network comprises generating a group payment account associated with the private group transaction network, wherein the group payment account is configured in communication with each of the first, second, and third payment accounts; processing, with at least one processor, an intra-group transfer request between the first and second group members and the third group member for a transfer amount by: executing, with at least one processor, a plurality of pull transfers summing at least to the transfer amount by pulling at least the transfer amount from the first and second payment accounts to the group payment account in separate pull transfers; and executing, with at least one processor, a single push transfer for the transfer amount by pushing the transfer amount from the group payment account to the third payment account.

Clause 2: The method of clause 1, further comprising: generating, with at least one processor, a token for each of the received account identifiers; associating, with at least one processor, each generated token with each associated account identifier; and executing, with at least one processor, the plurality of pull transfers and/or the push transfer using the generated tokens.

Clause 3: The method of clause 1 or 2, further comprising: executing, with at least one processor, a plurality of intra-group transfer requests, each intra-group transfer request executed between at least two of the at least three group members, wherein the plurality of intra-group transfer requests comprise a first intra-group transfer request and a second intra-group transfer request; generating, with at least one processor, first transfer data associated with a first intra-group transfer corresponding to the first intra-group transfer request; generating, with at least one processor, second transfer data associated with a second intra-group transfer corresponding to the second intra-group transfer request; and tracking, with at least one processor, the plurality of intra-group transfer requests using a blockchain based on the first transfer data and the second transfer data.

Clause 4: The method of any of clauses 1-3, wherein processing the intra-group transfer request comprises invoking a smart contract associated with the group.

Clause 5: The method of any of clauses 1-4, wherein at least two of the first payment account, second payment account, and third payment account are based out of different countries.

Clause 6: The method of any of clauses 1-5, wherein the first payment account, second payment account, and third payment account are personal payment accounts.

Clause 7: The method of any of clauses 1-6, wherein the intra-group transfer request comprises a loan request having loan parameters, wherein the loan parameters are specified by at least one of the first group member, the second group member, and the third group member.

Clause 8: A system for operating a private group transaction network, comprising at least one processor programmed or configured to: receive a group creation request to cause generation of a private group transaction network, wherein the group creation request identifies contact information associated with at least three group members; communicate a group invitation to each of the at least three group members; receive a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network comprising the first, second, and third group members, wherein generating the private group transaction network comprises generating a group payment account associated with the private group transaction network, wherein the group payment account is configured in communication with each of the first, second, and third payment accounts; process an intra-group transfer request between the first and second group members and the third group member for a transfer amount by: executing a plurality of pull transfers summing at least to the transfer amount by pulling at least the transfer amount from the first and second payment accounts to the group payment account in separate pull transfers; and executing a single push transfer for the transfer amount by pushing the transfer amount from the group payment account to the third payment account.

Clause 9: The system of clause 8, wherein the at least one processor is programmed or configured to: generate a token for each of the received account identifiers; associate each generated token with each associated account identifier; and execute the plurality of pull transfers and/or the push transfer using the generated tokens.

Clause 10: The system of clause 8 or 9, wherein the at least one processor is programmed or configured to: execute a plurality of intra-group transfer requests, each intra-group transfer request executed between at least two of the at least three group members, wherein the plurality of intra-group transfer requests comprise a first intra-group transfer request and a second intra-group transfer request; generate first transfer data associated with a first intra-group transfer corresponding to the first intra-group transfer request; generate second transfer data associated with a second intra-group transfer corresponding to the second intra-group transfer request; and track the plurality of intra-group transfer requests using a blockchain based on the first transfer data and the second transfer data.

Clause 11: The system of any of clauses 8-10, wherein processing the intra-group transfer request comprises invoking a smart contract associated with the group.

Clause 12: The system of any of clauses 8-11, wherein at least two of the first payment account, second payment account, and third payment account are based out of different countries.

Clause 13: The system of any of clauses 8-12, wherein the first payment account, second payment account, and third payment account are personal payment accounts.

Clause 14: The system of any of clauses 8-13, wherein the intra-group transfer request comprises a loan request having loan parameters, wherein the loan parameters are specified by at least one of the first group member, the second group member, and the third group member.

Clause 15: A computer program product for operating a private group transaction network comprising at least one non-transitory computer-readable medium including program instructions that, when executed by at least one processor, cause the at least one processor to: receive a group creation request to cause generation of a private group transaction network, wherein the group creation request identifies contact information associated with at least three group members; communicate a group invitation to each of the at least three group members; receive a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network comprising the first, second, and third group members, wherein generating the private group transaction network comprises generating a group payment account associated with the private group transaction network, wherein the group payment account is configured in communication with each of the first, second, and third payment accounts; process an intra-group transfer request between the first and second group members and the third group member for a transfer amount by: executing a plurality of pull transfers summing at least to the transfer amount by pulling at least the transfer amount from the first and second payment accounts to the group payment account in separate pull transfers; and executing a single push transfer for the transfer amount by pushing the transfer amount from the group payment account to the third payment account.

Clause 16: The computer program product of clause 15, wherein the program instructions cause the at least one processor to: generate a token for each of the received account identifiers; associate each generated token with each associated account identifier; and execute the plurality of pull transfers and/or the push transfer using the generated tokens.

Clause 17: The computer program product of clause 15 or 16, wherein the program instructions cause the at least one processor to: execute a plurality of intra-group transfer requests, each intra-group transfer request executed between at least two of the at least three group members, wherein the plurality of intra-group transfer requests comprise a first intra-group transfer request and a second intra-group transfer request; generate first transfer data associated with a first intra-group transfer corresponding to the first intra-group transfer request; generate second transfer data associated with a second intra-group transfer corresponding to the second intra-group transfer request; and track the plurality of intra-group transfer requests using a blockchain based on the first transfer data and the second transfer data.

Clause 18: The computer program product of any of clauses 15-17, wherein processing the intra-group transfer request comprises invoking a smart contract associated with the group.

Clause 19: The computer program product of any of clauses 15-18, wherein at least two of the first payment account, second payment account, and third payment account are based out of different countries.

Clause 20: The computer program product of any of clauses 15-19, wherein the first payment account, second payment account, and third payment account are personal payment accounts.

Clause 21: The computer program product of any of clauses 15-20, wherein the intra-group transfer request comprises a loan request having loan parameters, wherein the loan parameters are specified by at least one of the first group member, the second group member, and the third group member.

Clause 22: A method for operating a private group transaction network, comprising: receiving, with at least one processor, a group creation request to cause generation of a private group transaction network, wherein the group creation request identifies contact information associated with at least three group members; communicating, with at least one processor, a group invitation to each of the at least three group members; receiving, with at least one processor, a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generating, with at least one processor, the private group transaction network comprising the first, second, and third group members, wherein generating the private group transaction network comprises generating a group payment account associated with the private group transaction network, wherein the group payment account is configured in communication with each of the first, second, and third payment accounts; executing, with at least one processor, a group savings protocol by: generating, with at least one processor, a group savings schedule comprising at least one contribution date on which a contribution amount is pulled from each of the first, second, and third payment accounts to the group payment account and a plurality of disbursement dates comprising: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, wherein the first disbursement date, the second disbursement date, and the third disbursement date are different from each other; generating and storing, with at least one processor, a plurality of data entries associated with the group savings schedule, the plurality of data entries comprising: a contribution data entry comprising the contribution date, at least one contribution amount, and data associated with the first, second, and third payment accounts; a first disbursement data entry comprising the first disbursement date, the first disbursement amount, and data associated with the first payment account; a second disbursement data entry comprising the second disbursement date, the second disbursement amount, and data associated with the second payment account; and a third disbursement data entry comprising the third disbursement date, the third disbursement amount, and data associated with the third payment account; based on the plurality of data entries, transferring, with at least one processor and based on the at least one contribution date, the at least one contribution amount from each of the first, second, and third payment accounts to the group payment account; processing, with at least one processor, a schedule update event to exchange the first disbursement date in the first disbursement data entry with the second disbursement date in the second disbursement data entry by modifying the first disbursement data entry and the second disbursement data entry; and automatically transferring, with at least one processor and based on the first disbursement date, the second disbursement amount from the group payment account to the second payment account, based on the modified second disbursement data entry.

Clause 23: The method of clause 22, further comprising: transmitting a schedule update request message from a device of the second group member to a device of the first group member, the schedule update request message comprising a schedule update request corresponding to the schedule update event; and initiating processing of the schedule update event in response to receiving an acceptance message from the device of the first group member, the acceptance message accepting the schedule update request.

Clause 24: The method of clause 22 or 23, further comprising: automatically transferring, with at least one processor and based on the second disbursement date, the first disbursement amount from the group payment account to the first payment account, based on the modified first disbursement data entry.

Clause 25: The method of any of clauses 22-24, further comprising tracking the group savings schedule using a blockchain based on the plurality of data entries associated with the group savings schedule.

Clause 26: The method of any of clauses 22-25, wherein tracking the group savings schedule using the blockchain comprises tracking the schedule update event using the blockchain.

Clause 27: The method of any of clauses 22-26, wherein at least two of the first payment account, second payment account, and third payment account are based out of different countries.

Clause 28: The method of any of clauses 22-27, wherein the first payment account, second payment account, and third payment account are personal payment accounts.

Clause 29: The method of any of clauses 22-28, wherein processing the schedule update event comprises invoking a smart contract associated with the group.

Clause 30: A system for operating a private group transaction network, comprising at least one processor programmed or configured to: receive a group creation request to cause generation of a private group transaction network, wherein the group creation request identifies contact information associated with at least three group members; communicate a group invitation to each of the at least three group members; receive a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network comprising the first, second, and third group members, wherein generating the private group transaction network comprises generating a group payment account associated with the private group transaction network, wherein the group payment account is configured in communication with each of the first, second, and third payment accounts; execute a group savings protocol by: generating a group savings schedule comprising at least one contribution date on which a contribution amount is pulled from each of the first, second, and third payment accounts to the group payment account and a plurality of disbursement dates comprising: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, wherein the first disbursement date, the second disbursement date, and the third disbursement date are different from each other; generating and storing a plurality of data entries associated with the group savings schedule, the plurality of data entries comprising: a contribution data entry comprising the contribution date, at least one contribution amount, and data associated with the first, second, and third payment accounts; a first disbursement data entry comprising the first disbursement date, the first disbursement amount, and data associated with the first payment account; a second disbursement data entry comprising the second disbursement date, the second disbursement amount, and data associated with the second payment account; and a third disbursement data entry comprising the third disbursement date, the third disbursement amount, and data associated with the third payment account; based on the plurality of data entries, transferring based on the at least one contribution date, the at least one contribution amount from each of the first, second, and third payment accounts to the group payment account; processing a schedule update event to exchange the first disbursement date in the first disbursement data entry with the second disbursement date in the second disbursement data entry by modifying the first disbursement data entry and the second disbursement data entry; and automatically transferring, based on the first disbursement date, the second disbursement amount from the group payment account to the second payment account, based on the modified second disbursement data entry.

Clause 31: The system of clause 30, wherein the at least one processor is programmed or configured to: transmit a schedule update request message from a device of the second group member to a device of the first group member, the schedule update request message comprising a schedule update request corresponding to the schedule update event; and initiate processing of the schedule update event in response to receiving an acceptance message from the device of the first group member, the acceptance message accepting the schedule update request.

Clause 32: The system of clause 30 or 31, wherein the at least one processor is programmed or configured to: automatically transfer, based on the second disbursement date, the first disbursement amount from the group payment account to the first payment account, based on the modified first disbursement data entry.

Clause 33: The system of any of clauses 30-32, wherein the at least one processor is programmed or configured to: track the group savings schedule using a blockchain based on the plurality of data entries associated with the group savings schedule.

Clause 34: The system of any of clauses 30-33, wherein tracking the group savings schedule using the blockchain comprises tracking the schedule update event using the blockchain.

Clause 35: The system of any of clauses 30-34, wherein at least two of the first payment account, second payment account, and third payment account are based out of different countries.

Clause 36: The system of any of clauses 30-35, wherein the first payment account, second payment account, and third payment account are personal payment accounts.

Clause 37: The system of any of clauses 30-36, wherein processing the schedule update event comprises invoking a smart contract associated with the group.

Clause 38: A computer program product for operating a private group transaction network comprising at least one non-transitory computer-readable medium including program instructions that, when executed by at least one processor, cause the at least one processor to: receive a group creation request to cause generation of a private group transaction network, wherein the group creation request identifies contact information associated with at least three group members; communicate a group invitation to each of the at least three group members; receive a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages, generate the private group transaction network comprising the first, second, and third group members, wherein generating the private group transaction network comprises generating a group payment account associated with the private group transaction network, wherein the group payment account is configured in communication with each of the first, second, and third payment accounts; execute a group savings protocol by: generating a group savings schedule comprising at least one contribution date on which a contribution amount is pulled from each of the first, second, and third payment accounts to the group payment account and a plurality of disbursement dates comprising: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, wherein the first disbursement date, the second disbursement date, and the third disbursement date are different from each other; generating and storing a plurality of data entries associated with the group savings schedule, the plurality of data entries comprising: a contribution data entry comprising the contribution date, at least one contribution amount, and data associated with the first, second, and third payment accounts; a first disbursement data entry comprising the first disbursement date, the first disbursement amount, and data associated with the first payment account; a second disbursement data entry comprising the second disbursement date, the second disbursement amount, and data associated with the second payment account; and a third disbursement data entry comprising the third disbursement date, the third disbursement amount, and data associated with the third payment account; based on the plurality of data entries, transferring based on the at least one contribution date, the at least one contribution amount from each of the first, second, and third payment accounts to the group payment account; processing a schedule update event to exchange the first disbursement date in the first disbursement data entry with the second disbursement date in the second disbursement data entry by modifying the first disbursement data entry and the second disbursement data entry; and automatically transferring, based on the first disbursement date, the second disbursement amount from the group payment account to the second payment account, based on the modified second disbursement data entry.

Clause 39: The computer program product of clause 38, wherein the program instructions cause the at least one processor to: transmit a schedule update request message from a device of the second group member to a device of the first group member, the schedule update request message comprising a schedule update request corresponding to the schedule update event; and initiate processing of the schedule update event in response to receiving an acceptance message from the device of the first group member, the acceptance message accepting the schedule update request.

Clause 40: The computer program product of clause 38 or 39, wherein the program instructions cause the at least one processor to: automatically transfer, based on the second disbursement date, the first disbursement amount from the group payment account to the first payment account, based on the modified first disbursement data entry.

Clause 41: The computer program product of any of clauses 38-40, wherein the program instructions cause the at least one processor to: track the group savings schedule using a blockchain based on the plurality of data entries associated with the group savings schedule.

Clause 42: The computer program product of any of clauses 38-41, wherein tracking the group savings schedule using the blockchain comprises tracking the schedule update event using the blockchain.

Clause 43: The computer program product of any of clauses 38-42, wherein at least two of the first payment account, second payment account, and third payment account are based out of different countries.

Clause 44: The computer program product of any of clauses 38-43, wherein the first payment account, second payment account, and third payment account are personal payment accounts.

Clause 45: The computer program product of any of clauses 38-44, wherein processing the schedule update event comprises invoking a smart contract associated with the group.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 6 is a schematic diagram of a group savings schedule, according to some non-limiting embodiments or aspects;

DETAILED DESCRIPTION

Figure 1:
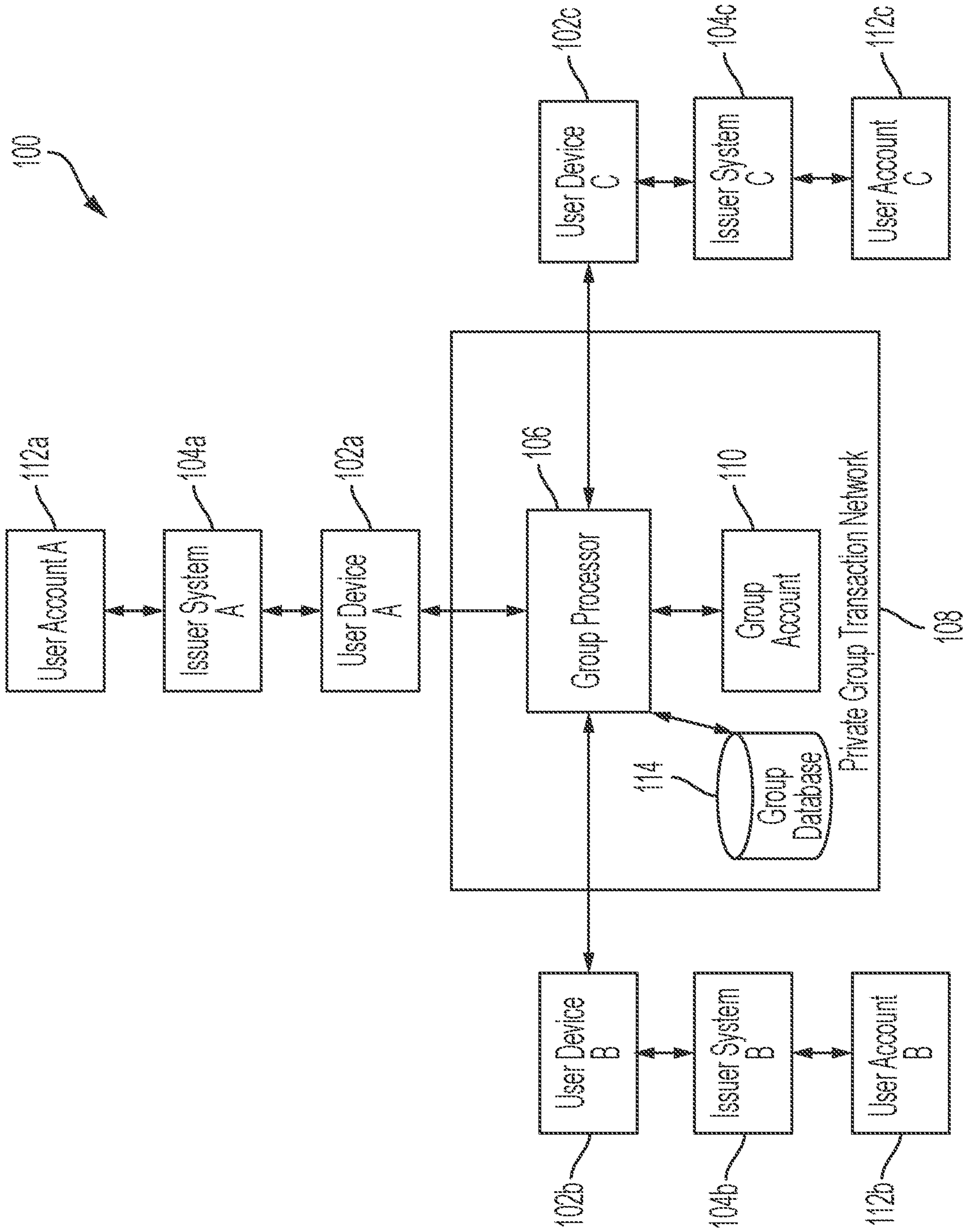
FIG. 1 is a schematic diagram of a system for operating a private group transaction network, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may refer to one or more types of identifiers associated with an account (e.g., a primary account number (PAN) associated with an account, a card number associated with an account, a payment card number associated with an account, a token associated with an account, a phone number associated with a mobile money account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchants or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as POS devices and/or POS systems used by a merchant. In some non-limiting embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, personal digital assistants (PDAs), wearable devices, such as watches, glasses, lenses, and/or clothing, and/or the like), and/or other like devices. Moreover, the term "client" may also refer to an entity, such as a merchant, that owns, utilizes, and/or operates a client device for facilitating payment transactions with a transaction service provider.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing device may be a non-mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

Non-limiting embodiments or aspects are directed to methods, systems, and computer program products for operating a private group transaction network. Non-limiting embodiments or aspects generate a private group transaction network including plurality of group members. The private group transaction network comprises a group payment account from which to execute transactions associated with the private group. The group payment account is pre-configured to engage in payment transactions with each user payment account in the group. The group payment account is uniquely arranged to connect via the group processor to the individual payment accounts of the group members to form a private network, and the individual payment accounts may be issued to the group members from different issuer systems compared to the group account or other individual payment accounts of the group members. The group payment account is pre-configured to engage in payment transactions with each user payment account in the group using a group processor configured to conduct transfers among the various individual payment accounts and the group payment account. Such arrangement of the group payment account of the private group with the individual payment accounts of the group members enables the interoperability of electronic payment transactions between members of the group having different account types, payment device types, issuers, countries, and the like, thus enhancing the efficiency of processing electronic payment transactions between different group members. This arrangement solves the problems associated with group members having payment accounts from different issuers that are not configured to engage in payment transactions with one another by employing the group payment account and group processor, which are pre-configured to engage in payment transactions with any payment account of a group member, thus enabling the group payment account to efficiently function as an intermediary payment account to effect payment transactions between or among any combination of group members.

Non-limiting embodiments or aspects of the methods, systems, and computer program products for operating a private group transaction network enable peer-to-peer (referring to both peer-to-peer and group-to-peer) electronic lending transactions within the private group transaction network to be executed while minimizing processing resources required to execute the electronic transaction. The peer-to-peer electronic lending transactions are configurable by the member-borrower and/or member-lender and are executed by transferring funds from the member-lender(s) [personal payment account(s)] to the member-borrower(s) [personal payment account(s)], as opposed to from a commercial lender payment account (i.e., without involvement of a commercial lending system). The funds from the loan are transferred from the member-lender(s) personal payment account to the group payment account in a pull transfer, where separate pull transfers are made from each member-lenders personal payment account to the group payment account. The funds from the loan are transferred from the group payment account to the member-borrower's personal payment account in a single push transfer. The use of the single push transfer from the group payment account to the member-borrower's personal payment account conserves processing resources compared to existing systems which require a plurality of transfers to be pushed to the borrower, one from each of the plurality of lender accounts. Thus, for lending transactions made to a borrower from many lenders, such as at least 5 lenders, at least 10 lenders, and the like, as many transfers to the borrower's account would be required, as opposed to the single push transfer in the present disclosure. The execution of the electronic lending transaction through the group payment account and group processor, which are configured to execute transactions with each personal payment account of the group members, further enables efficient transfer of funds from the various member-lenders' accounts to the member-borrower account, with the member-borrower account receiving a single push transfer for the loan amount. The use of the group payment account and group processor, which are already configured to engage in funds transfers with each borrower and lender account, enhances the efficiency of the transfers by utilizing a payment account (the group account) pre-arranged via the group processor to engage in fund transfers with each account, such that new connections need not be established between lender accounts and borrower account in order to effectuate each transfer in the lending transaction. Existing systems do not include this unique arrangement of the group processor pre-configured to engage in fund transfers with each payment account and instead rely on establishing the proper connection between each lender and borrower payment accounts, thus delaying the speed and efficiency of the transfer. Further, the use of a blockchain to track activity associated with the electronic lending transaction enables efficient and accurate tracking throughout the lifecycle of the electronic lending transaction. The use of blockchain may enable the group members to see which members engaged in transactions or made some other change affecting the group members to enhance transparency within the group. The electronic lending transaction may be executed according to a smart contract associated with the group to control parameters associated with the electronic lending transaction and efficiently execute electronic lending transactions comporting to the controlled parameters.

Non-limiting embodiments or aspects of the methods, systems, and computer program products for operating a private group transaction network enable execution of a group savings protocol involving modification of a group savings schedule. The private group may execute a group savings goal by periodically transferring funds from the individual members' payment accounts to the group payment account. Further, the group payment account may periodically automatically disburse at least a portion of the funds from the group payment account to individual members' payment accounts according to a generated group savings schedule, such that individual group members receive funds at different times. The private group transaction network is uniquely arranged to enable processing of schedule update events to modify the group savings schedule, thus modifying the automatic disbursement of funds to the individual group member accounts associated with the schedule update event. The schedule update events may be triggered by communications between group members. This protocol enables enhanced flexibility to the private group transaction network in executing fund disbursements to individual member accounts. The group savings schedule and modifications thereto may be tracked using a blockchain ensure efficient and accurate tracking throughout the lifecycle of the group savings schedule. The use of blockchain may enable the group members to see which members engaged in transactions, made modifications to the group savings schedule, or made some other change affecting the group members to enhance transparency within the group. The group savings protocol may be executed according to a smart contract associated with the group to control parameters associated with the group savings schedule and efficiently automatically execute schedule update events and individual disbursements comporting to the controlled parameters.

Referring now to FIG. 1, a system 100 is shown for operating a private group transaction network according to some non-limiting embodiments or aspects. The system 100 includes a plurality, such as at least three, users who mutually form a private group to manage money together, such as by executing different types of transactions as described hereinafter. In some non-limiting embodiments or aspects, a user may be a member of a plurality of different groups including a plurality of different members. The private group may comprise members of the group and may exclude non-members of the group.

In some non-limiting embodiments or aspects, the system 100 may include at least three user devices 102*a*-102*c*, each user device associated with a different member (user) of the group. The user devices 102*a*-102*c* may comprise a computing device comprising a mobile application to enable the user device 102*a*-102*c* to engage in the system 100. The group members may have one or more payment devices issued to them that are associated with one or more payment accounts issued by an issuer. The payment account issued by the issuer may be a card-based payment account or a non-card based payment account, such as a mobile money account. At least two of the group members may have a payment account issued by a different issuer system compared to one another. As shown in FIG. 1, in some non-limiting embodiments or aspects, there are at least three group members, each having a user device 102*a*-102*c*, and each of the at least three group members has at least one user account 112*a*-112*c* (e.g., a payment account) issued by a different issuer system 104*a*-104*c* compared to the other group members. The user accounts 112*a*-112*c* may be personal payment accounts of the group members, as opposed to commercial payment accounts of a financial institution. However, non-limiting embodiments or aspects are not limited thereto, and some of the at least three group members may have user accounts 112*a*-112*c* issued by a same issuer system as other members of the group. The user device 102*a*-102*c* may communicate with the corresponding issuer system 104*a*-104*c* to initiate certain transactions as described herein. For example, user devices 102*a*-102*c*, issuer systems 104*a*-104*c*, and user accounts 112*a*-112*c* may interconnect (e.g., establish a connection to communicate, transfer funds, etc.) within a private group transaction network 108 comprising a group processor 106, a group account 110 (e.g., a payment account), and a group database 114. The devices and systems may interconnect via wired connections, wireless connections, or a combination of wired and wireless connections.

In some non-limiting embodiments or aspects, the system 100 may be capable of handling various electronic transactions between or among group members having user accounts 112*a*-112*c* issued by different issuers. Moreover, the system 100 may be capable of engaging with different tenant systems other than issuer systems to conduct the various transactions, such as different merchant systems, acquirer systems, transaction service provider systems, financial technology (fintech) systems, and the like. As such, the group members do not need an account from a same bank in order to conduct transactions with other group members and/or as a member of the private group transaction network 108 with outside parties, but instead may continue to use their existing bank by registering and onboarding that bank with the group processor 106.

The system 100 may provide a multi-tenancy interoperability architecture by comprising the group processor 106, and the group processor 106 may be configured to initiate and/or process transactions with the various user accounts 112*a*-112*c* associated with the various group members. In some non-limiting embodiments or aspects, interoperability among different bank accounts or issuer accounts may be provided by the group processor 106 comprising different versions (e.g., different software applications, etc.) for different bank accounts or issuer accounts from different issuer systems which use a same backend, which allows for flexibility of the payment service.

In some non-limiting embodiments or aspects, the group processor 106 may communicate with a plurality of user devices 102*a*-102*c*, a plurality of issuer systems 104*a*-104*c*, and/or one or more other tenant systems to process a transaction. Such transactions may comprise push and/or pull transfers from one or more accounts of the group members to a group account 110 associated with the group to credit and/or debit money to or from the group account 110 and/or to make the money available for other transactions between and/or among the group members. Such transactions may comprise push and/or pull transfers to effect a peer-to-peer loan between and/or among group members, with the loaned amount passing through or coming from the group account 110. Such transactions may comprise periodic contributions from the user accounts 112*a*-112*c* to the group account 110, followed by rotating, periodic disbursements to the user accounts 112*a*-112*c* according to a group savings schedule. The group processor 106 may automatically provide, to the plurality of user devices 102*a*-102*c* of the group members via an application front end interface, data associated with the processed transactions associated with the private group transaction network 108, thereby providing transparency and visibility of transactions that occur between group members.

In some non-limiting embodiments or aspects, the group processor 106 may receive an account identifier (e.g., a PAN, etc.) associated with a group member's user account 112*a*-112*c* to register the user with the private group transaction network 108. The group processor 106 may generate and/or receive a token associated with the account identifier (e.g., from a payment service system), and the token may be used (e.g., in place of the account identifier) to conduct the various transactions between or among the group members. The token may be associated with the account identifier and the association stored in the group database 114.

In some non-limiting embodiments or aspects, the group processor 106 may store transaction data associated with transactions of the private group transaction network 108 in the group database 114 using a blockchain or a distributed ledger technology to track the various transactions conducted by the group members. For example, using a blockchain to store transaction data associated with transactions of the private group transaction network 108 and/or among group members may enable increased transparency for the group members to show that each of the group members is operating according to the agreed upon rules associated with the group (e.g., embodied in a smart contract) for managing the group account 110 as a group. The use of blockchain may enable the group members to see which members engaged in transactions or made some other change affecting the group members to enhance transparency within the group. The private group transaction network 108 may operate according to a smart contract stored on the blockchain, and conditions of the smart contract as detailed by the code thereof may be automatically executed by the system 100. The use of blockchain technology further enables scalability such that many groups may be added to and/or operate on the same platform.

With continued reference to FIG. 1, the private group transaction network 108 (including the group processor 106, group account 110 and group database 114) interconnecting with the user devices 102*a*-102*c*, issuer systems 104*a*-104*c*, and/or user accounts 112*a*-112*c* may be generated such that the electronic transactions described herein may be processed. The private group transaction network 108 may be generated by the group processor 106 receiving a group creation request. The group creation request may be generated and communicated by at least one of the user devices 102*a*-102*c* and communicated to the group processor 106. The group creation request may comprise data identifying contact information associated with at least three individuals designated as potential members of the group (e.g., contact information of the other user devices 102*a*-102*c*).

In response to receiving the group creation request, the group processor 106 may generate and communicate a group invitation to the user devices 102*a*-102*c* of the at least three potential group members. The group invitation may comprise at least one selectable option to enable the potential group members to accept and/or reject becoming a member of the group. The user devices 102*a*-102*c* may generate and communicate a response message to the group processor 106 in response to the group members interacting with the at least one selectable option. In response to a potential group member selecting an option to not join the group, the response message may comprise a group decline message comprising data indicating that the declining potential group member should be excluded from the group being generated.

In response to a potential group member selecting an option to join the group, the response message may comprise a group acceptance message comprising data indicating that the accepting potential group member should be included in the group being generated. The group acceptance message may further comprise an account identifier associated with a payment account (e.g., user accounts 112*a*-112*c*) of the accepting group member. Each accepting group member may have a separate payment account from the other accepting group members.

Each of the payment accounts may have been issued to the user by an issuer. At least one of the accepting group members may have a payment account issued to the user by an issuer different from the issuer of the other accepting group members' payment accounts. Each of the accepting group members may have a payment account issued by a different issuer, or all the users may have payment accounts issued by the same issuer.

At least one of the payment accounts may be based out of a different country compared to the payment accounts of the other potential group members, such that the system 100 enables the processing of cross-border electronic transactions. The payment account may be based out of the country in which the payment account was opened and may be indicated by a country identifier associated with the payment account. The payment account may have an associated default currency based on the country from which the payment account is based. For transactions involving a user account 112*a*-112*c* having a different default currency compared to the group account 110, the exchange rate between the default currency of the user account 112*a*-112*c* and the group account 110 may be determined at the time of the transaction such that the correct amount may be transferred to and/or from the user account.

Each of the payment accounts may be a personal payment account issued to the group member, as opposed to being a commercial payment account.

In response to receiving group acceptance messages from at least three potential group members, the group processor 106 may generate the private group transaction network 108 comprising the at least three group members. Generating the private group transaction network 108 may comprise generating the group account 110, which is a payment account associated with the group, to which funds from the group may be saved and from which payments of the group may be transferred. Generating the private group transaction network 108 may comprise configuring the user accounts 112*a*-112*c* in communication with the group account 110 via the group processor 106 so that fund transfers may be made between the group account 110 and any of the user accounts 112*a*-112*c*.

Generating the private group transaction network 108 may comprise storing data in the group database 114 associated with the group. Non-limiting examples of data associated with the group will be described hereinafter in connection with FIG. 3. Generating the private group transaction network 108 may comprise at least one of the group members selecting group options and/or settings to be used for the group for communicating among group members, adding and/or removing group members, updating group data, updating group rules, and/or conducting electronic transactions among the group members. The group options and/or settings may be selected by the group member using at least one user device 102*a*-102*c* and may be communicated to the group processor 106 for implementation.

Figure 2:
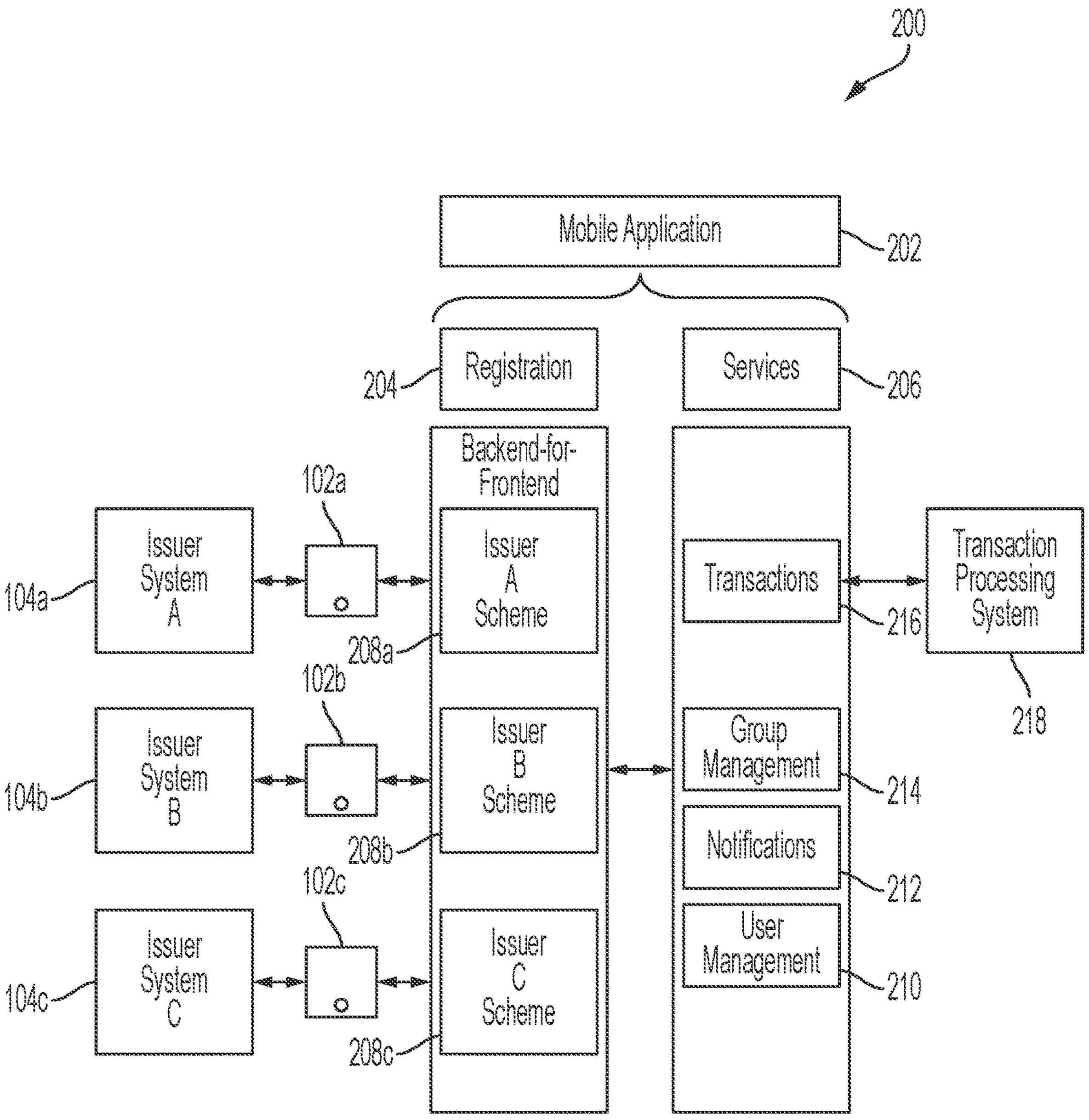
FIG. 2 is a schematic diagram of a system for operating a private group transaction network, according to some non-limiting embodiments or aspects.

Referring to FIG. 2, a system 200 for operating a private group transaction network is shown, according to some non-limiting embodiments or aspects. The system 200 shows how the group members (via the user devices 102*a*-102*c*) may engage with the private group transaction network 108 (from FIG. 1). The system 200 may comprise a mobile application 202 configured to run on a user device 102*a*-102*c*, or the system 200 may additionally or alternatively comprise a website accessible by the user device 102*a*-102*c* for the user to engage with the private group transaction network 108.

The mobile application 202 may comprise a registration layer 204, which may comprise a backend-for-frontend (BFF) between a services layer 206 and the user devices 102*a*-102*c* and/or the issuer systems 104*a*-104*c*. The issuer systems 104*a*-104*c* associated with the group members may each be onboarded with the private group transaction network 108 such that the group processor 106 (from FIG. 1) may engage with the various different issuer systems 104*a*-104*c* to conduct electronic transactions over the private group transaction network 108. This enables the private group transaction network 108 to process electronic transactions among the group members, regardless of the whether the group members have payment accounts issued by different issuer systems 104*a*-104*c*. The issuer systems 104*a*-104*c* may be based out of different countries, such that cross-border transactions may be processed by the private group transaction network 108. The private group transaction network 108 may specify a default currency in which to conduct electronic transactions.

The BFF may comprise issuer schemes 208*a*-208*c* for each issuer system 104*a*-104*c* onboarded with the system 200. The issuer schemes 208*a*-208*c* may be customized for each issuer system 104*a*-104*c*, such as including issuer identifying material (e.g., a logo) or having a scheme or appearance as specified by the issuer (such as according to a style sheet). As such, the user devices 102*a*-102*c* may display the mobile application 202 based on the issuer scheme 208*a*-208*c* associated with the issuer system 104*a*-104*c* associated with that user's account 112*a*-112*c* (from FIG. 1). The BFF may generate a services request to be communicated to the services layer 206, which may include reformatting the data received from the user devices 102*a*-102*c* into a standardized format consistent with the requirements of the services layer 206.

With continued reference to FIG. 2, the services layer 206 of the mobile application 202 may comprise program instructions to enable the system 200 to execute the various services available using the mobile application 202. Non-limiting examples of the services may include user management services 210, notification services 212, group management services 214, and transaction services 216.

The user management services 210 may comprise services associated with managing user access and user settings in the private group transaction network 108. The notification services 212 may comprise services associated with notifications sent to and/or from user devices 102*a*-102*c*, such as the content of notifications, frequency of notifications, trigger for notifications, notification settings, and the like. The group management services 214 may comprise services associated with managing group settings and/or may enable the group processor 106 (from FIG. 1) to conduct transfers among the various user accounts 112*a*-112*c* and the group payment account 110 by connecting the account identifiers (or tokenized account identifiers) of the user accounts 112*a*-112*c* and the group payment account 110.

The transaction services 216 may comprise services associated with processing electronic transactions over the private group transaction network 108, including any of the electronic transactions described herein. The services layer 206 may communicate with a transaction processing system 218 to facilitate execution of fund transfers associated with the electronic transactions.

Figure 3:
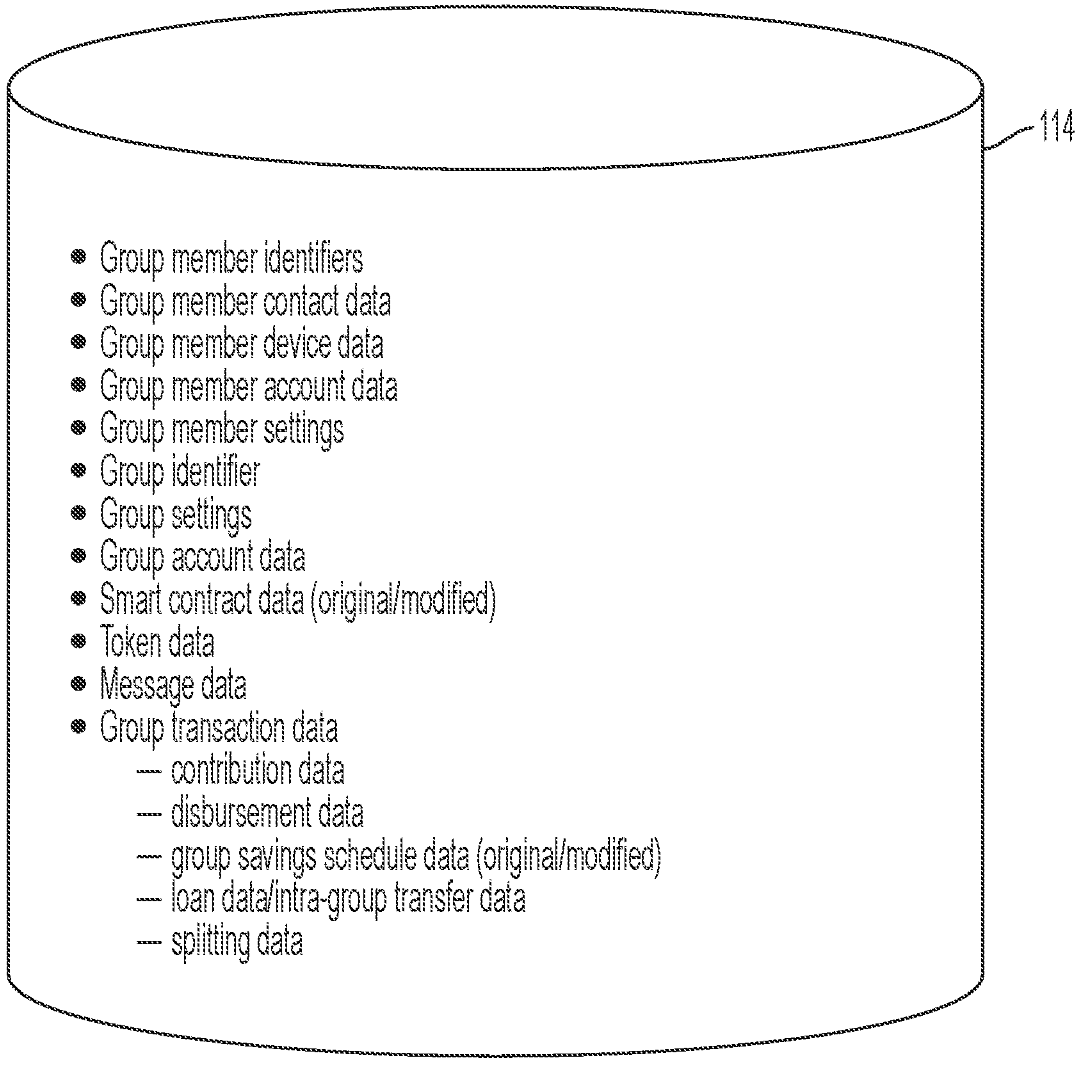
FIG. 3 is a schematic diagram of a group database, according to some non-limiting embodiments or aspects.

Referring to FIGS. 1 and 3, the private group transaction network 108 may comprise the group database 114. The group database 114 may store data associated with the private group transaction network 108, group members thereof, and electronic transactions conducted thereover.

Regarding group members of the private group transaction network 108, the group database 114 may store an identifier associated with each group member. The identifier may include the name of the group member or other personally identifiable information associated with the group member. The identifier may be a unique identifier assigned to the group member, such as a unique identifier generated by the group processor 106 during generation of the private group transaction network 108. The group database 114 may store contact data associated with each group member, such as at least one of an email address or phone number. The group database 114 may store device data associated with the group member, such as a device identifier associated with the user device 102*a*-102*c*, an IP address, device location data, and the like. The group database 114 may store user account data, such as an account identifier associated with the user account 112*a*-112*c*, a token associated with the user account 112*a*-112*c*, a user account balance, a user account history, issuer data associated with the issuer of the user account 112*a*-112*c*, and the like. The group database 114 may store group member settings, such as group member access settings, group member notification settings, group member layout settings, group start and/or end date, target savings amounts, identification of group members, and other group member preferences.

Regarding the private group transaction network 108, the group database 114 may store an identifier associated with the group. The group identifier may be a unique identifier assigned to the group, and may be generated by the group processor 106 during generation of the private group transaction network 108. The group database 114 may store group settings, such as group access settings, group notification settings, group layout settings, and other group preferences. The group database 114 may store group account data, such as an account identifier associated with the group account 110, a token associated with the group account 110, a group account balance, a group account history, issuer data associated with the issuer of the group account 110, and the like.

The group database 114 may store smart contract data associated with a smart contract generated for the private group transaction network 108. The smart contract may be a program stored (e.g., on blockchain) to automatically execute an outcome upon predetermined conditions being met. The smart contract may be generated and/or configured during generation of the private group transaction network 108, with the predetermined conditions and automated outcomes being specified by at least one group member. The smart contract may be modified by the group to update at least one condition and/or outcome at any time. The group database 114 may store the original smart contract, the modified smart contract, and/or data associated with modifying the smart contract. The smart contract may be analyzed by being invoked during certain transaction processing and/or activities of the private group transaction network 108 to determine whether the predetermined conditions have been met to automatically execute the outcome.

The group database 114 may store token data. As previously mentioned, the group member account data and/or group account data may comprise a token associated with the account identifier. The token may be used to replace and/or supplement and/or alter the account identifier during electronic transaction processing. The token data may associate the token with the original account identifier (of the user account 112*a*-112*c* or the group account 110).

The group database 114 may store message data. The message data may comprise contact data associated with each group member to which communications are to be sent. The message data may comprise messaging preferences associated with the group and/or group members. The message data may comprise a message history storing data associated with messages sent over the private group transaction network 108 between or among group members.

The group database 114 may store group transaction data associated with transactions processed over the private group transaction network 108. The group transaction data may comprise contribution data associated with contributions of funds transferred from the user account 112*a*-112*c* to the group account 110. The contribution data may comprise a date and/or amount associated with a contribution, as well as data associated with the group member and/or user account 112*a*-112*c* from which the contribution originated. The contribution data may comprise data indicating that a group member scheduled to make a contribution has not yet made the contribution from the user account 112*a*-112*c* to the group account 110.

The group transaction data may comprise disbursement data associated with disbursements of funds transferred from the group account 110 to at least one of the user accounts 112*a*-112*c*. The disbursement data may comprise a date and/or amount associated with a disbursement, as well as data associated with the group member and/or user account 112*a*-112*c* to which the disbursement amount was transferred.

The group transaction data may comprise group savings schedule data. As discussed in connection with FIG. 6 herein, contributions and disbursements between the user accounts 112*a*-112*c* and the group account 110 may be executed according to the group savings schedule. The group savings schedule data may comprise data associated with the contributions and disbursements in the group savings schedule, such as scheduled transaction data, transaction type, data associated with the group member and/or user account 112*a*-112*c* to or from which the transaction amount is transferred, and the like. The group savings schedule may be modified as described herein, and the group database may store the original group savings schedule, the modified group savings schedule, and/or data associated with modifying the group savings schedule.

The group transaction data may comprise loan data and/or intra-group transfer data. Loan data may comprise data associated with loans made between group members of the private group transaction network 108, such as lender member(s) data and/or lender member(s) account data, borrower member(s) data and/or borrower member(s) account data, loan parameters (e.g., loan amount, payout schedule, payback period, interest rate, and the like), whether a guarantor will be used for the loan and a guarantor identifier if so, origination date, payback date(s), historic loan data, and the like. Intra-group transfer data may comprise data associated with any funds transfer between group members (e.g., loan, gift, crowdfunding, etc.).

The group transaction data may comprise splitting data. A plurality of group members may purchase a product/service as a group, such that the purchase amount is split among the group members involved in the transaction. The splitting data may comprise data associated with the split transaction, such as involved group members and/or account data associated with the involved members, purchased product and/or service data, purchase amount, amount due by each of the involved group members, transfer data associated with settlement of the involved group members for the purchase amount, and the like.

The group transaction data may be stored in a traditional database structure. Additionally and/or alternatively, the group transaction data may be stored and/or tracked using a blockchain as a distributed ledger to enable efficient and accurate tracking of the transactions of the private group transaction network 108.

The ledger used to track group transaction data, which may cause the group processor 106 to execute a function, of the private group transaction network 108 may have several primary functions. The ledger may cause the creation or termination of a new group, including setting group savings targets, contribution and disbursement timing, managing invitation and responses for forming the group, and establishing the associated logic or rules associated with the group. The ledger may also execute any changes to the group, such as the addition or removal of group members, switching of contribution or disbursement order, logic or rules associated with the group, and the like. The ledger may prompt transmission notifications and/or interactions between and among the group members, such as messages to cause group members to accept or deny a loan request, notifications to remind a user to make a timely contribution, and the like. The ledger may track agreements between at least two of the group members, such as electronic lending transactions or swaps of disbursement dates between group members.

To execute these functions, the ledger may comprise a plurality of layers, including an interface layer, a ledger layer, and an observer layer. The interface layer may function as a router of requests between and among the group members. The interface layer may also protect the ledger layer and observer layer from processing improper information, e.g., inconsistent with the logic or rules of the group. The ledger layer may create, update, and delete data associated with the required functionality. The ledger layer may be built on blockchain technology or use another suitable database structure. The observer layer may manage all read requests of the group members, such as read requests associated with viewing transaction histories, loan data, and the like.

Figure 4A:
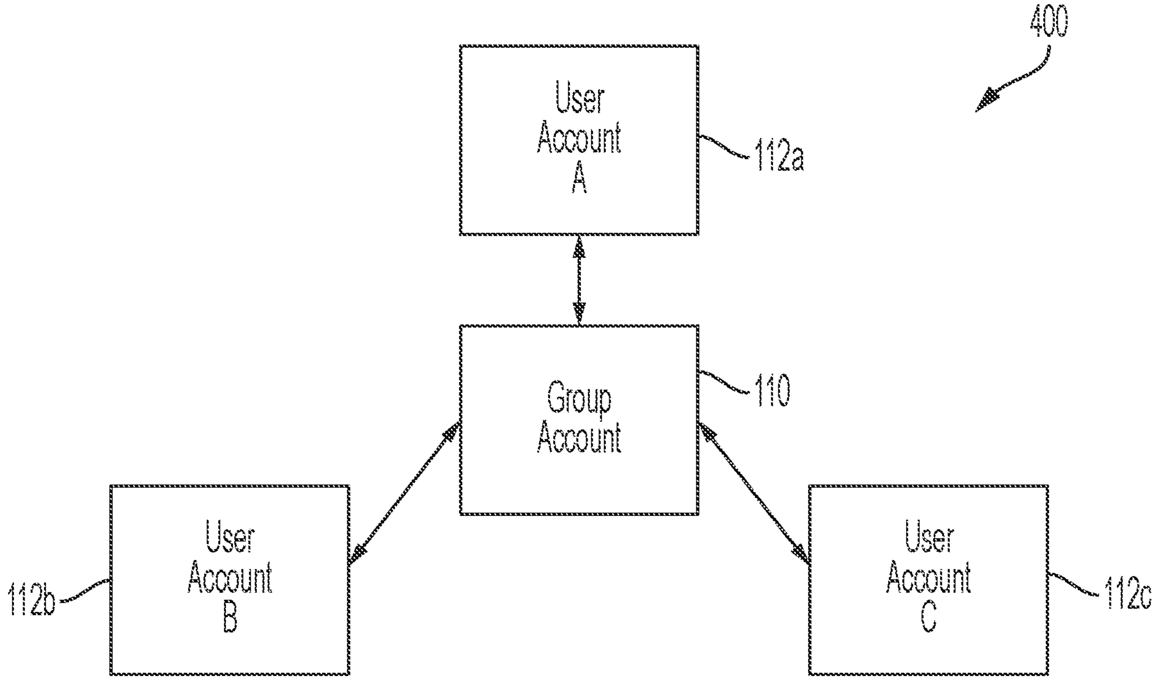
FIG. 4A is a schematic diagram of a transaction flow over the private group transaction network, according to some non-limiting embodiments or aspects.

Referring to FIG. 4A, a transaction flow 400 for processing electronic transactions over the private group transaction network 108 (from FIG. 1) is shown, according to some non-limiting embodiments or aspects. In the transaction flow 400, the group account 110 may be connected with the user accounts 112*a*-112*c* of the group members. By this arrangement, any of the user accounts 112*a*-112*c* may transfer funds to the group account 110 and/or the group account 110 may transfer funds to any of the user accounts 112*a*-112*c* (using the group processor 106 (from FIG. 1)). The group account 110 may be programmed or configured to process such transfers with any of the user accounts 112*a*-112*c*, regardless of the issuer system 104*a*-104*c* (from FIG. 1) issuing the user account 112*a*-112*c*. Thus, the group account 110 may be compatible for fund transfers with any of the issuer systems 104*a*-104*c* of the user accounts 112*a*-112*c*.

The fund transfers may be push and/or pull transfers. Push and pull transfers are referred to as such based the movement of funds relative to the group account 110. Fund transfers being made to the group account 110 are referred to herein as pull transfers because the funds are being transferred away from a user account 112*a*-112*c* toward the group account. Fund transfers being made from the group account 110 are referred to herein as push transfers because the funds are being transferred away from the group account 110 toward a user account 112*a*-112*c*. The fund transfers from a user account 112*a*-112*c* to the group account 110 may be original credit transactions (OCTs) in which the user account 112*a*-112*c* sends the funds to the group account 110, or the fund transfers from a user account 112*a*-112*c* to the group account 110 may be account funding transactions (AFTs) in which the group account 110 pulls the funds from the user account 112*a*-112*c*. The fund transfers from the group account 110 to a user account 112*a*-112*c* may be OCTs in which the group account 110 sends the funds to user account 112*a*-112*c*, or the fund transfers from the group account 110 to a user account 112*a*-112*c* may be AFTs in which the user account 112*a*-112*c* pulls the funds from the group account 110.

With continued reference to FIG. 4A, group member(s) may transfer or receive funds from any other group member (s) using the illustrated arrangement of components. For example, for a fund transfer from user account A 112*a* (of group member A) to user account B 112*b* (of group member B), funds may be transferred from user account A 112*a* to the group account 110. The funds may be transferred from the group account 110 to user account B 112*b*. The funds transfers may be push and/or pull transfers to effect the transfer of funds from user account A 112*a* to user account B 112*b*. The fund transfer may be executable according to this protocol even if issuer system A 104*a* of user account A 112*a* is not compatible with or not programmed or configured to make a funds transfer directly with issuer system B 104*b* of user account B 112*b* because the group account 110 is used as an intermediary account, and group account 110 is programmed or configured via the group processor 106 for fund transfers with any of the user accounts 112*a*-112*c* of the private group transaction network 108. Therefore, the arrangement of FIG. 4A enables for interoperability of electronic payment transactions between members of the group having different account types, payment device types, issuers, countries, and the like, thus enhancing the efficiency of processing electronic payment transactions between different group members. It will be appreciated that the sender and/or recipient of the funds may be a single group member or a plurality of group members (e.g., group member A transferring funds to group members B and C or group members A and B transferring funds to group member C).

Figure 4B:
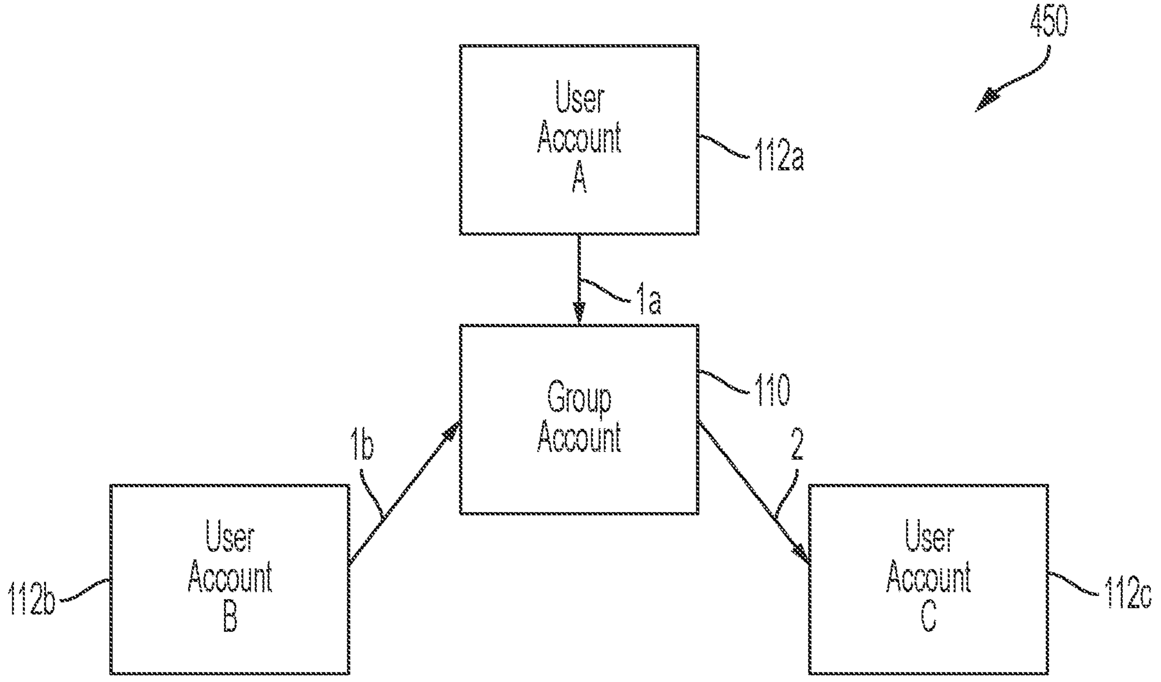
FIG. 4B is a schematic diagram of a transaction flow over the private group transaction network, according to some non-limiting embodiments or aspects.

Referring to FIG. 4B, a transaction flow 450 over the private group transaction network 108 (from FIG. 1) is shown, according to some non-limiting embodiments or aspects. Referring to FIGS. 1, 2, and 4B, intra-group transfer requests may be processed by the private group transaction network 108. The intra-group transfer request may comprise a peer-to-peer electronic lending transaction. The electronic lending request may comprise a lending of a loan amount from a plurality of group members to a single group member. The electronic lending transaction may comprise only group members, and the electronic lending transaction may be made between the personal payment accounts of the users, as opposed to from a commercial payment account of a financial institution.

The electronic lending transaction may have loan parameters, and the intra-group transaction request may comprise data associated with the loan parameters. The loan parameters may comprise a loan amount to be transferred to the group member-borrower. The loan parameters may comprise a portion of the loan amount to be contributed from each of the plurality of group member-lenders. The loan parameters may comprise a payback period by which the loan amount must be returned by the group member-borrower and/or a rate at which the loan amount must be returned over a time period. The loan parameters may comprise an interest rate associated with the loan. The loan parameters may comprise a payout schedule over which the loan amount will be provided to the group member-borrower, which may be in a single installment or a plurality of installments.

The loan parameters may be specified by any of the group members associated with the electronic lending transaction, such as the group member-borrower and/or the group member-lenders. The group members associated with the electronic lending transaction may communicate over the private group transaction network 108 (e.g., by messages sent using the user devices 102*a*-102*c* over the private group transaction network 108) to determine and agree upon the loan parameters. For example, the group member-borrower may communicate proposed loan parameters to the group member-lenders, and the group member-lenders may accept the proposed loan parameters to initiate the electronic lending transaction. The group member-lender(s) may communicate proposed loan parameters to the group member-borrower, and the group member-borrower may accept the proposed loan parameters to initiate the electronic lending transaction. In electronic lending transactions including a guarantor, the guarantor may be required to accept the proposed loan parameters in order to execute the electronic lending transaction. In electronic lending transactions including a guarantor, a portion of the funds for the loan amount may be pulled from each user account 112*a*-112*c* of each guarantor. In electronic lending transactions conducted without a guarantor, the funds for the loan amount may be pushed from the group account 110 to the user account of the member-borrower without first pulling funds from a group member-lender's user account specifically for the electronic lending transaction, such that the loan may effectively be from the group as a whole instead of individual members of the group (it will be noted that the funds for the loan amount may have been previously pulled from various user accounts 112*a*-112*c* to the group account 110 according to a groups savings schedule or one-time transfer without being explicitly earmarked for use in connection with a loan).

The loan parameters (or any other parameters associated with an intra-group transfer) may be restricted by the smart contract of the group, which may be programmed to automatically process electronic lending transactions having loan parameters consistent with predetermined acceptable loan conditions. For example, the smart contract may specify acceptable loan parameters for electronic lending transactions of the group and/or may restrict a number of loans and/or amount of loans being made by the group member-borrower or a group member-lender, such that if the electronic lending transaction satisfies the smart contract conditions, processing of the electronic lending transaction is automatically initiated, and if the electronic lending transaction does not satisfy the smart contract conditions, processing of the electronic lending transaction is automatically prohibited. Thus, processing of intra-group transfer requests, such as those associated with electronic lending transactions, comprises invoking the smart contract associated with the group.

Once the loan parameters have been accepted by all involved group members, a smart contract associated with the electronic lending transaction may be generated which reflects the loan parameters and any rules associated with the electronic lending transaction and enables automatic execution thereof. The smart contract associated with the electronic lending transaction may comprise a lending identifier to identify the electronic lending transaction, and the smart contract associated with the electronic lending transaction may be stored using a blockchain for efficient and transparent processing during the lifecycle of the electronic lending transaction. The transfers conducted to effect the electronic lending transaction may receive transfer identifiers which may be stored and associated with data corresponding to the transfers using the blockchain. This may include disbursement transfers and payback transfers.

As a non-limiting example, FIG. 4B illustrates execution of an electronic lending transaction of a loan amount from user account A 112*a* and user account B 112*b* to user account C 112*c* in response to the intra-group transfer request. To execute the electronic lending transaction, at a step 1*a*, the group account 110 may receive a first amount of funds from the user account A 112*a*. The first amount of funds may be transferred to the group account 110 via a pull transfer initiated by the group account 110. At a step 1*b*, the group account 110 may receive a second amount of funds from the user account B 112*b*. The second amount of funds may be transferred to the group account 110 via a pull transfer initiated by the group account 110. The first amount of funds and the second amount of funds may sum at least to the loan amount. Thus fund transfers (e.g., pull transfers) in steps 1*a* and 1*b* may be separate pull transfers that may be conducted simultaneously or sequentially. It will be appreciated that while the example in FIG. 4B shows two group member-lenders, more than two group member-lenders may be included in the electronic lending transaction, or a single group member-lender may provide a loan amount to one or more group member-borrower(s). The group member-lenders may be guarantors of the electronic lending transaction in which the transfers from the group member-lenders to the group member-borrower were specifically earmarked for the electronic lending transaction, or the electronic lending transaction may be without an individual guarantor, such that the electronic lending transaction was made by the group account 110 (thus the group as a whole) using the funds transferred thereto which may not have been explicitly earmarked for the electronic lending transaction.

With continued reference to FIG. 4B, in step 2, the loan amount may be transferred from the group account 110 to the user account C 112*c*. Step 2 may occur after steps 1*a* and 1*b* have been completed. The loan amount may be transferred to the user account C 112 in a single push transfer. The execution of the electronic lending transaction through the group account 110, which is configured to execute transactions with each of the user accounts 112*a*-112*c*, enables efficient transfer of funds from the various member-lenders' accounts to the member-borrower account, with the borrower account receiving a single push transfer for the loan amount.

In some non-limiting embodiments or aspects, a chat function of the private group transaction network 108 may be used to initiate the electronic lending transaction. For example, a message from a group member requesting a loan and/or from a group member (e.g., a group administrator) requesting a loan on behalf of another group member to the other group members may request an electronic lending transaction be initiated for a loan amount according to proposed loan parameters. The group members may approve or deny the loan request by a response message. In response to the group members approving the loan request, the group member-borrower and/or the group administrator may initiate processing of the electronic lending transaction as described above. If the balance of the group account 110 already exceeds the loan amount, no further pull transfers (beyond those that have previously occurred) from user accounts 112*a*-112*c* are required before the group account 110 pushes the loan amount to the group member-borrower's account. However, if the balance of the group account

110 does not exceed the loan amount, pull transfers from at least one of the user accounts 112*a*-112*c* may be conducted before the group account 110 pushes the loan amount to the group member-borrower's account.

While the embodiment in FIG. 4B has been described in the context of an electronic lending transaction, it will be appreciated that other intra-group transfers may be executed using the same protocol, such as a gift transfer of funds from a plurality of group members to a single group member or a crowdfunding transfer of funds from a plurality of group members to a single group member.

For example, for the gift transfer of funds, the group members associated with user account A 112*a* and user account B 112*b* may initiate a gift transaction having a gift amount to the group member associated with user account C 112*c*. The gift transaction may be a voluntarily given gift amount not requiring a return of payment. For the gift transaction, at a step 1*a*, the group account 110 may receive a first amount of funds from the user account A 112*a*. The first amount of funds may be transferred to the group account 110 via a pull transfer initiated by the group account 110. At a step 1*b*, the group account 110 may receive a second amount of funds from the user account B 112*b*. The second amount of funds may be transferred to the group account 110 via a pull transfer initiated by the group account 110. The first amount of funds and the second amount of funds may sum at least to the gift amount. Thus, fund transfers (e.g., pull transfers) in steps 1*a* and 1*b* may be separate pull transfers that may be conducted simultaneously or sequentially. In step 2, the gift amount may be transferred from the group account 110 to the user account C 112*c*. Step 2 may occur after steps 1*a* and 1*b* have been completed. The gift amount may be transferred to the user account C 112*c* in a single push transfer.

For example, for the crowdfunding transfer of funds, the group members associated with user account A 112*a* and user account B 112*b* may initiate a crowdfunding transaction having a crowdfunding amount to the group member associated with user account C 112*c*. The crowdfunding transaction may comprise a fundraising process raising funds from a plurality of group members earmarked for use on a specific activity. For the crowdfunding transaction, at a step 1*a*, the group account 110 may receive a first amount of funds from the user account A 112*a*. The first amount of funds may be transferred to the group account 110 via a pull transfer initiated by the group account 110. At a step 1*b*, the group account 110 may receive a second amount of funds from the user account B 112*b*. The second amount of funds may be transferred to the group account 110 via a pull transfer initiated by the group account 110. The first amount of funds and the second amount of funds may sum at least to the crowdfunding amount. Thus fund transfers (e.g., pull transfers) in steps 1*a* and 1*b* may be separate pull transfers that may be conducted simultaneously or sequentially. In step 2, the crowdfunding amount may be transferred from the group account 110 to the user account C 112*c*. Step 2 may occur after steps 1*a* and 1*b* have been completed. The crowdfunding amount may be transferred to the user account C 112*c* in a single push transfer. The user account C 112*c* may use the crowdfunding amount towards the earmarked specific activity. In some non-limiting embodiment or aspects, step 2 may not be conducted, and the group account 110 may be used to use crowdfunding amount towards the earmarked specific activity, as opposed to the specific user account C 112*c* being used to use the crowdfunding amount.

Figure 5A:
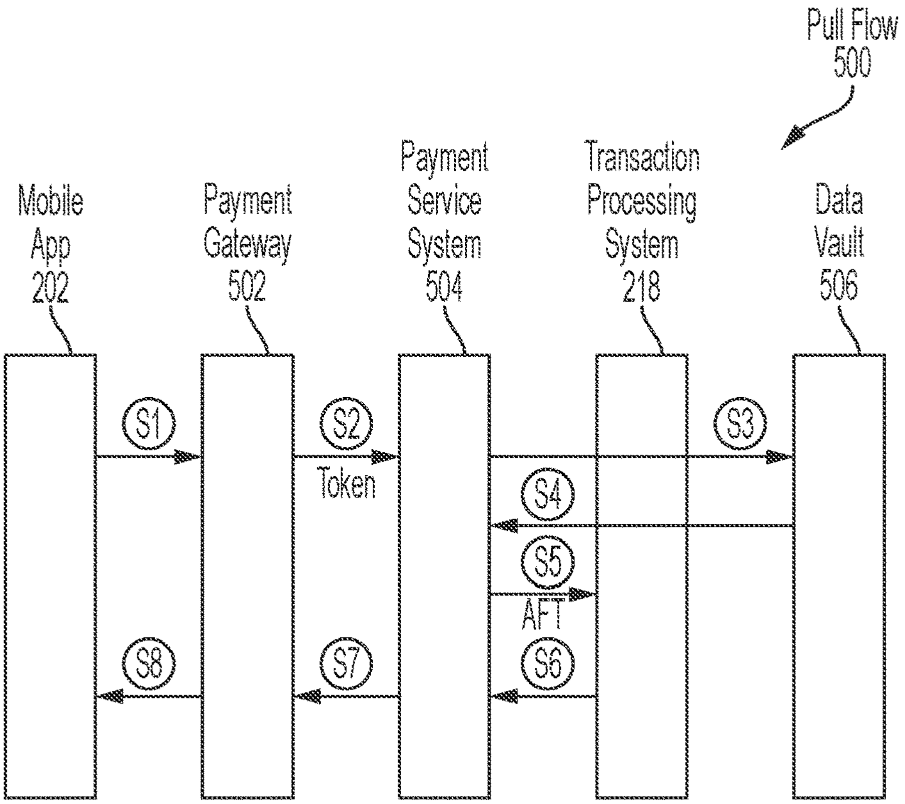
FIG. 5A is a schematic diagram of a pull transfer flow over the private group transaction network, according to some non-limiting embodiments or aspects.

Referring to FIG. 5A, a pull transfer flow 500 conducted over the private group transaction network 108 (from FIG. 1) is shown, according to some non-limiting embodiments or aspects. The pull transfer from the pull transfer flow 500 may be the pull transfer previously described in connection with FIG. 4B.

With continued reference to FIG. 5A and also referring to FIGS. 1 and 4B, at a step S1, at least one of the group members (e.g., the group member-borrower or a group member-lender) may communicate the intra-group transfer request via the mobile application 202 from one of the user devices 102*a*-102*c* to a payment gateway 502. The payment gateway 502 may be the payment gateway associated with the user account 112*a* or 112*b* from which the funds are to be pulled and/or the payment gateway associated with the group account 110. The intra-group transfer request communicated to the payment gateway 502 may comprise the account identifier associated with the user account 112*a* or 112*b* from which the funds are to be pulled or data to enable the account identifier to be retrieved by the payment gateway 502. At a step S2, the payment gateway 502 may generate a first pull transfer request and communicate the first pull transfer request to a payment service system 504. The first pull transfer request may comprise the account identifier or a token in place of the account identifier so as to minimize circulation of the account identifier during the transaction. The payment service system 504 may be a system configured to replace the token received from the payment gateway 502 with the account identifier so that the transaction processing system 218 may execute the pull transfer. At a step S3, the payment service system 504 may communicate a token retrieval request comprising the token to a data vault 506 which associates user account identifiers with corresponding tokens. In some non-limiting embodiments or aspects, the data vault 506 may be the group database 114. At a step S4, the data vault 506 may respond to the payment service system 504 with a token response comprising the account identifier associated with the token.

At a step S5, the payment service system 504 may generate a second pull transfer request comprising the account identifier and communicate the second pull transfer request to the transaction processing system 218. In response to the second pull transfer request, the transaction processing system 218 may execute the pull transfer as described in connection with FIG. 4B.

With continued reference to FIG. 5A, at a step S6, upon successful completion of the pull transfer, the transaction processing system 218 may generate and communicate a completion message to the payment service system 504 comprising data which indicates successful completion of the pull transfer. At a step S7, the payment service system 504 may communicate the completion message to the payment gateway 502. At a step S8, the payment gateway 502 may communicate the completion message to the mobile application 202 to notify at least one of the group members of successful completion of the pull transfer, such as the group member associated with the payment account from which the funds were pulled.

The embodiment described in connection with FIG. 5A included execution of the pull transfer using a token for at least a portion of the pull transfer flow 500. However, it will be appreciated that the pull transfer flow 500 may be conducted without the use of a token. In such an example, the steps S3 and S4 may be excluded, and in some non-limiting embodiments or aspects, the payment service system 504 may be removed such that the payment gateway 502 communicates with the transaction processing system 218 to initiate the pull transfer using the original (non-tokenized) account identifier.

Figure 5B:
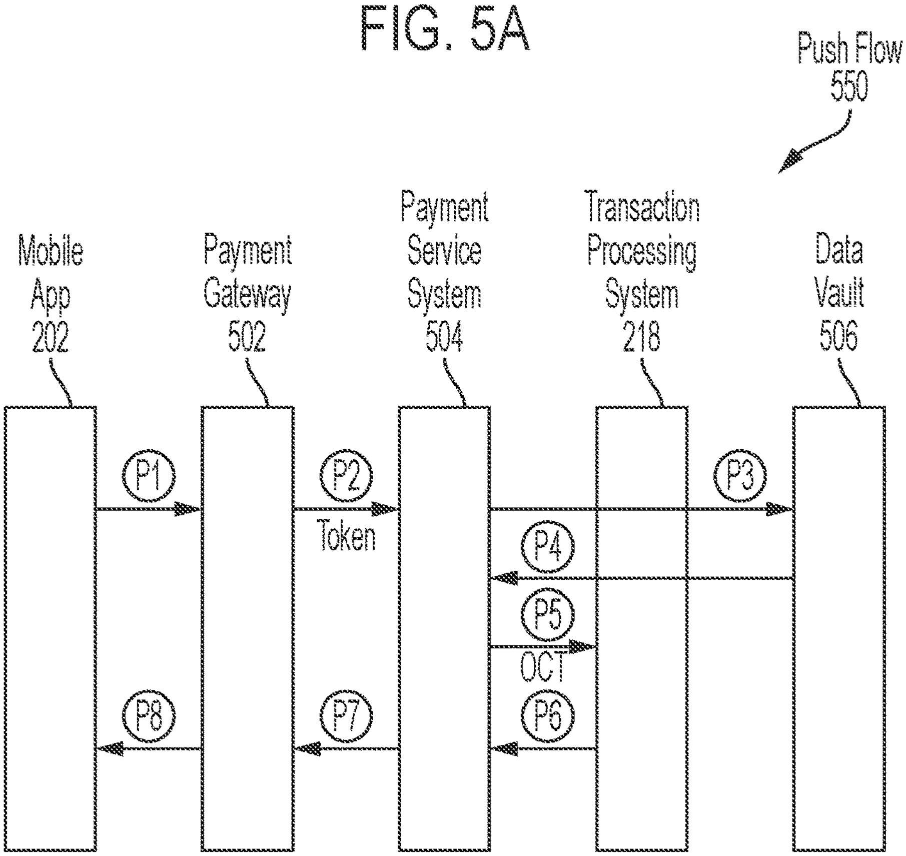
FIG. 5B is a schematic diagram of a push transfer flow over the private group transaction network, according to some non-limiting embodiments or aspects.

Referring to FIG. 5B, a push transfer flow 550 conducted over the private group transaction network 108 (from FIG. 1) is shown, according to some non-limiting embodiments or aspects. The push transfer from the push transfer flow 550 may be the push transfer previously described in connection with FIG. 4B.

With continued reference to FIG. 5B and also referring to FIGS. 1, 2, and 4B, at a step P1, at least one of the group members (e.g., the group member-borrower or a group member-lender) may communicate the intra-group transfer request via the mobile application 202 from one of the user devices 102*a*-102*c* to the payment gateway 502. The payment gateway 502 may be the payment gateway associated with the user account 112*a* or 112*b* to which the funds are to be pushed and/or the payment gateway associated with the group account 110. The intra-group transfer request communicated to the payment gateway 502 may comprise the account identifier associated with the user account 112*c* to which the funds are to be pushed or data to enable the account identifier to be retrieved by the payment gateway 502. At a step P2, the payment gateway 502 may generate a first push transfer request and communicate the first push transfer request to the payment service system 504. The first push transfer request may comprise the account identifier or a token in place of the account identifier so as to minimize circulation of the account identifier during the transaction. At a step P3, the payment service system 504 may communicate a token retrieval request comprising the token to the data vault 506 which associates user account identifiers with corresponding tokens. At a step P4, the data vault 506 may respond to the payment service system 504 with a token response comprising the account identifier associated with the token.

At a step P5, the payment service system 504 may generate a second push transfer request comprising the account identifier and communicate the second push transfer request to the transaction processing system 218. In response to the second push transfer request, the transaction processing system 218 may execute the push transfer as described in connection with FIG. 4B.

With continued reference to FIG. 5B, at a step P6, upon successful completion of the push transfer, the transaction processing system 218 may generate and communicate a completion message to the payment service system 504 comprising data which indicates successful completion of the push transfer. At a step S7, the payment service system 504 may communicate the completion message to the payment gateway 502. At a step S8, the payment gateway 502 may communicate the completion message to the mobile application 202 to notify at least one of the group members of successful completion of the push transfer, such as the group member associated with the payment account to which the funds were pushed, and the group transaction history may reflect the execution of the transfer.

The embodiment described in connection with FIG. 5B included execution of the push transfer using a token for at least a portion of the push transfer flow 550. However, it will be appreciated that the push transfer flow 550 may be conducted without the use of a token. In such example, the steps P3 and P4 may be excluded, and in some non-limiting embodiments or aspects, the payment service system 504 may be removed such that the payment gateway 502 communicates with the transaction processing system 218 to initiate the push transfer using the original account identifier.

Referring again to FIG. 1, the system 100 may execute a plurality of intra-group transaction requests, as previously described, with each intra-group transaction request being executed between at least two of the group members. Each of the intra-group transaction requests may invoke the smart contract for the group to determine whether the intra-group transaction request satisfies the conditions for execution, and if so, the intra-group transaction request may be automatically executed by the group processor 106. Each of the intra-group transaction requests may be tracked using a blockchain.

For example, the plurality of intra-group transaction requests executed by the system 100 may comprise a first intra-group transaction request and a second intra-group transaction request. The first intra-group transaction request may comprise first transfer data, and the second intra-group transaction request may comprise second transfer data. The transfer data may comprise parameters for the corresponding intra-group transaction request, such as recipient of funds, sender of funds, account data of accounts the funds are to be transferred to or from, transfer amount, transfer date, and the like. The first and second intra-group transaction requests may be tracked using a blockchain based on the first and second transfer data. The use of a blockchain to track the intra-group transfer requests may enable efficient and accurate tracking throughout the lifecycle of the intra-group transfer requests. Additionally or alternatively, the intra-group transfer requests may be tracked using a traditional database structure.

Referring to FIGS. 1 and 6, the system 100 may be configured to execute a group savings protocol for the group members over the private group transaction network 108, according to some non-limiting embodiments or aspects. The group savings protocol may comprise the group members periodically contributing funds to the group account 110 from their user accounts 112*a*-112*c*, and at least a portion of the funds from the group account 110 being periodically disbursed to different user accounts 112*a*-112*c* at different times. For example, the group members may automatically transfer funds to the group account 110 from their user accounts 112*a*-112*c* weekly, bi-weekly, monthly, and the like, or the group members may receive periodic messages which prompt the group members to accept the funds being transferred to the group account 110. The funds may be pulled (via a pull transfer) from the user accounts 112*a*-112*c* and into the group account 110 by the group processor 106. Each group member's user account 112*a*-112*c* may receive disbursed funds on a different day. The funds may automatically be disbursed from the group account 110 to the user account 112*a*-112*c* by the group processor 106 executing a push transfer.

With continued reference to FIGS. 1 and 6, according to some non-limiting embodiments or aspects, the group savings protocol may comprise generating a group savings schedule. FIG. 6 shows a non-limiting example of a group savings schedule 600. The group savings schedule 600 comprises at least one contribution date on which a contribution amount is pulled from each of the user accounts 112*a*-112*c* to the group account 110. The group savings schedule 600 also comprises a plurality of disbursement dates including a first disbursement date on which a first disbursement amount is pushed from the group account 110 to user account A 112*a*, a second disbursement date on which a second disbursement amount is pushed from the group account 110 to user account B 112*b*, and a third disbursement date on which a third disbursement amount is pushed from the group account 110 to user account C 112*c*, where the first disbursement date, the second disbursement date, and the third disbursement date are different from each other. The group processor 106 may automatically generate the disbursement dates, such as using a random number generator to determine an order in which the group members are to receive their disbursements. In the example group savings schedule 600 shown in FIG. 6, three contribution transactions are included in which $500 is pulled from each of the group members' user accounts 112*a*-112*c* on the first of each month (e.g., 9/1/2021). Moreover, each of the three group members has a different disbursement date in September 2021, with the first group member having a first disbursement date of Sep. 8, 2021, the second group member having a second disbursement date of Sep. 15, 2021, and the third group member having a third disbursement date of Sep. 22, 2021, each of the three disbursement dates being for an amount of $100. The group savings schedule 600 may also include the group member (or their user account 112*a*-112*c*) to which the disbursement is to be made or from which the contribution is to be pulled. The group savings schedule 600 may also include a current account balance for the group (e.g., the balance of the group account 110).

Based on the group savings schedule 600, a plurality of data entries may be generated that are associated with the group savings schedule 600. The data entries may be stored in a data file associated with the group savings schedule 600. The data entries may be stored in the group database 114.

The data entries may comprise a contribution data entry comprising the contribution date, at least one contribution amount, and data associated with the user accounts 112*a*-112*c* (e.g., account identifier, issuer identifier, user data, and the like). The contribution data entry may comprise data to enable the group processor 106 to execute the contribution transactions of the group savings schedule 600.

The data entries may comprise a first disbursement data entry comprising the first disbursement date, the first disbursement amount, and data associated with the user account A 112*a* (e.g., account identifier, issuer identifier, user data, and the like). The data entries may comprise a second disbursement data entry comprising the second disbursement date, the second disbursement amount, and data associated with the user account B 112*b* (e.g., account identifier, issuer identifier, user data, and the like). The data entries may comprise a third disbursement data entry comprising the third disbursement date, the third disbursement amount, and data associated with the user account C 112*c* (e.g., account identifier, issuer identifier, user data, and the like). The first, second, and third disbursement data entries may comprise data to enable the group processor 106 to automatically execute the disbursement transactions of the group savings schedule 600.

With continued reference to FIGS. 1 and 6, according to some non-limiting embodiments or aspects, the group processor 106 may automatically transfer the contribution amounts from each of the user accounts 112*a*-112*c* to the group account 110 using a pull transfer or communicate a message to the group members (e.g., user devices 102*a*-102*c*) to cause the group members to transfer the contribution amounts from each of the user accounts 112*a*-112*c* to the group account 110. The pull transfers may be executed according to the contribution data entry on the contribution date(s). The group processor 106 may automatically transfer the disbursement amounts from the group account 110 to the user accounts 112*a*-112*c* using a push transfer. The push transfers may be automatically executed according to the disbursement data entries on the disbursement dates.

With continued reference to FIGS. 1 and 6, according to some non-limiting embodiments or aspects, the group savings schedule 600 originally generated may be modified based on at least one schedule update event. The schedule update event may exchange at least one disbursement date and/or amount of a first user with a disbursement date and/or amount of a second user so that the first user receives their disbursement amount earlier or later than was scheduled in the original group savings schedule 600.

Generating the schedule update event may comprise a device of the second group member (user device B 102*b*) transmitting a schedule update request message to a device of the first group member (user device A 102*a*), with the schedule update request message comprising the schedule update request being proposed by the second group member. The schedule update request may comprise the disbursement dates and/or amounts proposed to be exchanged. The first group member may decline the schedule update request using user device A 102*a* to transmit a decline message to user device B 102*b*. The first group member may accept the schedule update request using user device A 102*a* to transmit an acceptance message to user device B 102*b*. The group processor 106 may automatically initiate processing of the schedule update request in response to receiving the acceptance message (e.g., from user device A 102*a* or user device B 102*b*).

With continued reference to FIGS. 1 and 6, according to some non-limiting embodiments or aspects, the schedule update request may comprise exchanging the first disbursement date of the first group member (group member A) with the second disbursement date of the second group member (group member B). Processing the schedule update event may comprise exchanging the first disbursement date in the first disbursement data entry with the second disbursement date in the second disbursement data entry by modifying the first disbursement data entry and the second disbursement data entry, so as to modify the group savings schedule 600. To execute the modified group savings schedule 600, the group processor 106 may automatically transfer, based on the first disbursement date, the second disbursement amount from the group account 110 to user account B 112*b*, based on the modified second disbursement data entry. Further, the group processor 106 may automatically transfer, based on the second disbursement date, the first disbursement amount from the group account 110 to user account A 112*a*, based on the modified first disbursement data entry.

While the above-described schedule update request comprised two group members exchanging disbursement dates, it will be appreciated that the group savings schedule may be modified, and that modification executed, in other ways, such as group members exchanging disbursement amounts and/or such as more than two group members being involved in the exchange of disbursement dates. There may be no limit on the number of modifications made to the originally-generated group savings schedule 600.

In some non-limiting embodiments or aspects, the group processor 106 may store the group savings schedule, such as the plurality of data entries associated with the group savings schedule 600 in the group database 114 using a blockchain or distributed ledger technology to track the group savings schedule 600 and the contribution and/or disbursement transactions specified thereby. The schedule update events which modify the group savings schedule 600 may also be tracked using the blockchain. Using blockchain to track the groups saving schedule 600, execution thereof, and modifications thereto may ensure efficient and accurate tracking throughout the lifecycle of the group savings schedule 600. Additionally or alternatively, the group savings schedule 600, execution thereof, and modifications thereto may be tracked using a traditional database structure.

The group savings schedule and modifications thereto may be restricted by the smart contract, which may be programmed to automatically generate the group savings schedule 600 and/or automatically modify the group savings schedule 600 consistent with predetermined acceptable group savings schedule and/or modification parameters. For example, the smart contract may specify an order and/or an amount of the disbursement transactions to the group members. The smart contract may restrict which group members may exchange disbursement dates, a time period during which exchanging disbursement dates is permitted, a number of times a group member may exchange disbursement dates, and the like. If the group savings schedule parameters and/or the modification parameters are consistent with the smart contract conditions, execution of the group savings schedule 600 or modification thereto may be automatically initiated, and if the group savings schedule parameters and/or the modification parameters do not satisfy the smart contract conditions, execution of the group savings schedule 600 or modification thereto may be automatically prohibited. Thus, processing and execution of the group savings schedule 600 and modifications thereto comprise invoking the smart contract associated with the group.

In some non-limiting embodiments or aspects, a one-time contribution of funds from the user account 112*a*-112*c* to the group account 110 may be executed that is not specified by the group savings schedule 600. The group member associated with a user account 112*a*-112*c* may initiate a one-time contribution by indicating a contribution amount and a contribution date and submitting the one-time fund contribution request. The group account 110 (via the group processor 106) may pull the contribution amount from corresponding user account 112*a*-112*c* on the contribution date. The one-time contribution of funds may be for any purpose, including to enable the group member behind on group contributions to at least partially catch up.

In some non-limiting embodiments or aspects, a one-time disbursement of funds from the group account 110 to a user account 112*a*-112*c* may be executed that is not specified by the group savings schedule 600. A group member, such as a group administrator, may initiate a one-time disbursement by indicating a disbursement amount, a disbursement date, and a user account 112*a*-112*c* to which funds are to be disbursed and submitting the one-time fund disbursement request. The group account 110 (via the group processor 106) may push the transfer amount to the selected user account 112*a*-112*c* on the disbursement date. The one-time disbursement of funds may be for any purpose, including to enable the group member to whom funds are transferred to make a purchase on behalf of the group.

In some non-limiting embodiments or aspects, a non-group member account may make a contribution to the group account 110 or the group account 110 (via the group processor 106) may disburse an amount to an account of a non-group member account.

In some non-limiting embodiments or aspects, the group savings protocol may not include automatic disbursements to user accounts 112*a*-112*c*. According to such protocol, the group members may periodically transfer funds from the user accounts 112*a*-112*c* to the group account 110 according to a group savings goal. A group member, such as a group administrator, may make purchases for the group from the group account 110 and/or may cause funds to be disbursed from the group account 110 to a user account 112*a*-112*c*, such that individual group members may use the funds for individual and/or group purchases.

Referring again to FIGS. 1 and 4A, the system 100 may execute at least one splitting transaction over the private group transaction network 108, according to some non-limiting embodiments or aspects. A splitting transaction may include a transaction amount for at least one purchase being split among a plurality of the group members. The original transaction may be initiated in response to the group members approving the original transaction to proceed using their user devices 102*a*-102*c*, such that authorization of the group members is obtained prior to the original transaction. Alternatively, the original transaction may be initiated before the group members approve splitting the transaction amount, such that the decision to split the transaction is made after the original transaction.

In some non-limiting embodiments or aspects, the transaction amount of the original transaction may be paid from the group account 110, as authorized by at least one of the group members. Subsequently, the user accounts 112*a*-112*c* may split the transaction amount into separate portions which sum to the transaction amount with each user account 112*a*-112*c* transferring the funds associated with its portion to the group account 110. The funds may be transferred to the group account 110 by the group processor 106 initiating a plurality of pull transfers with the user accounts 112*a*-112*c*. The funds may be transferred to the group account 110 by the group processor 106 communicating a message to the user devices 102*a*-102*c* specifying the amount of funds to be transferred by each of the user accounts 112*a*-112*c* to settle the split transaction, which user accounts 112*a*-112*c* may each approve transfer the funds due to the group account 110.

In some non-limiting embodiments or aspects, the transaction amount of the original transaction may be paid from one of the user accounts (e.g., user account A 112*a*), and user account A 112*a* is to be reimbursed for at least a portion of the transaction amount from the other user accounts (e.g., user account B 112*b* and user account C 112*c*). To reimburse user account A 112*a*, the funds due by user account B 112*b* and user account C 112*c* may be pulled from user account B 112*b* and user account C 112*c* to group account 110 in separate pull transfers. The group account 110 may push the reimbursing funds from the group account 110 to user account A 112*a* in a single push transfer, which may occur before and/or after receiving the funds to reimburse the user account A 112*a* from user account B 112*b* and/or user account C 112*c*.

Referring again to FIG. 1, the private group transaction network 108 may charge a transaction fee for each transaction conducted thereover. For example, a transaction fee may be charged for any of the intra-group transfer transactions (e.g., electronic lending transactions), contribution transactions, disbursement transactions, splitting transactions, and the like. The transaction fee may be a percent of a transaction or transfer amount and/or a flat rate. Further, a transaction fee schedule may be implemented which associates a transaction fee for various speeds at which the transaction is handled, such as faster transaction speeds incurring higher transaction fees and slower transaction speeds incurring lower to no transaction fees.

Figure 7A:
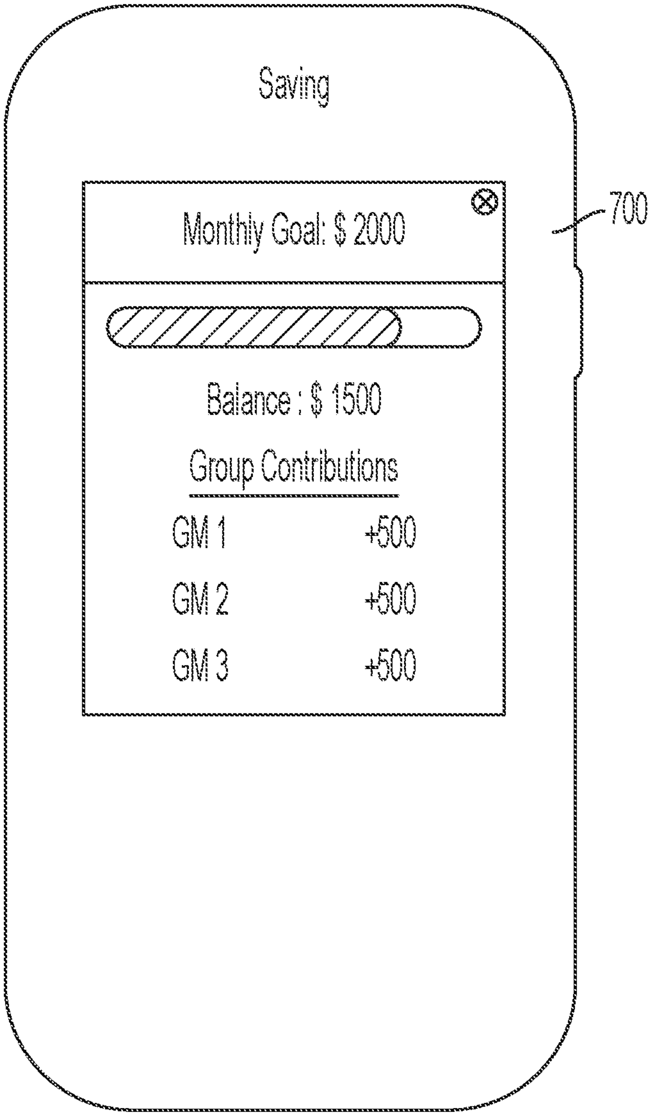
FIG. 7A is an illustration of a graphical user interface of a group savings function of the mobile application, according to some non-limiting embodiments or aspects.

Referring to FIG. 7A, a GUI 700 of a group savings function of the mobile application is shown, according to some non-limiting embodiments or aspects. The GUI 700 may display a balance of the group, which may correspond to the balance in the group account. The GUI 700 may display historic contributions made by each group member to the group account, which may include displaying the group member from which funds were transferred, the date of the funds transfer, and the transfer amount. The GUI 700 may display upcoming contributions to be made by each group member to the group account, which may include displaying the group member from which funds are to be transferred, the date of the funds transfer, and the transfer amount. The GUI 700 may display a group savings goal established by the group. The GUI 700 may display any other suitable data or graphics associated with savings of the group in the group account.

Figure 7B:
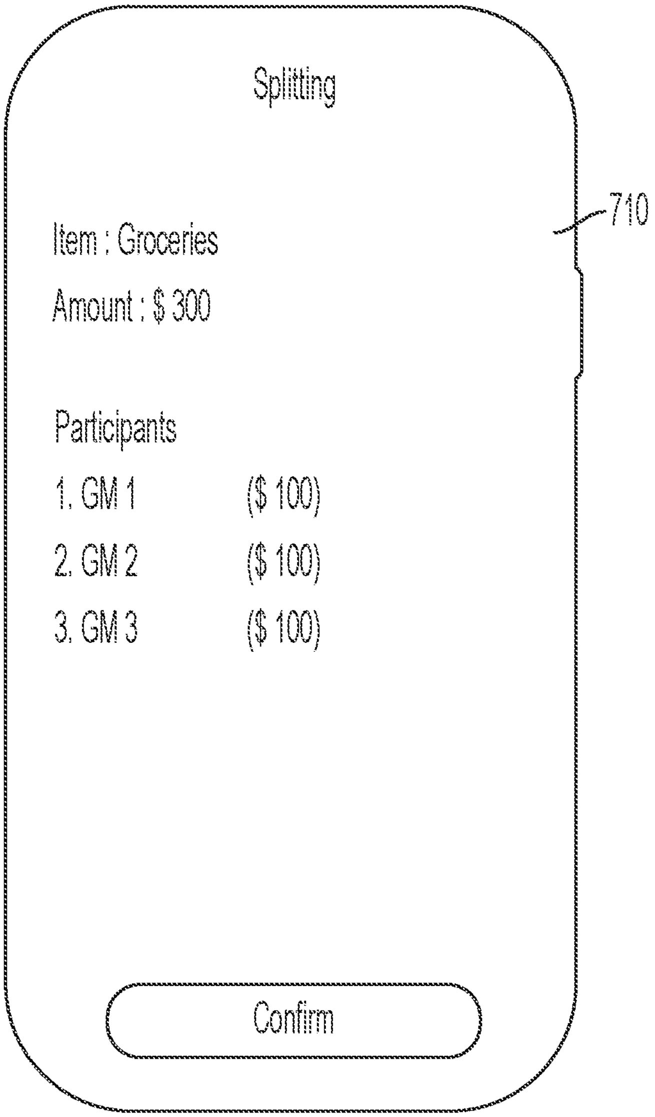
FIG. 7B is an illustration of a graphical user interface of a group splitting function of the mobile application, according to some non-limiting embodiments or aspects.

Referring to FIG. 7B, a GUI 710 of a group splitting function of the mobile application is shown, according to some non-limiting embodiments or aspects. The GUI 710 may display the transaction amount and the portion of the transaction amount due by each of the group members. The date of the transaction and/or the date of the reimbursements transfers may be displayed on the GUI 710. The identification of the group members involved in the splitting transaction and amounts due by each group member may be displayed on the GUI 710. The GUI 710 may display an identification of the item(s) purchase in the splitting transaction (e.g., "Groceries" in FIG. 7B).

Figure 7C:
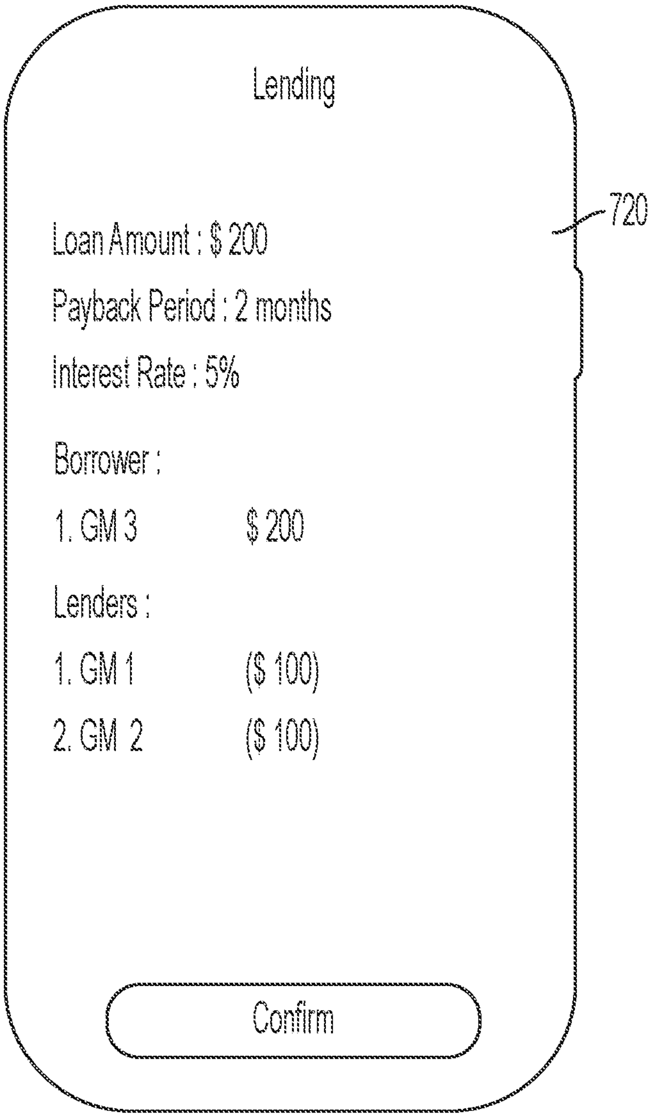
FIG. 7C is an illustration of a graphical user interface of a group lending function of the mobile application, according to some non-limiting embodiments or aspects.

Referring to FIG. 7C, a GUI 720 of a group lending function of the mobile application is shown, according to some non-limiting embodiments or aspects. The GUI 720 may display loan parameters associated with the electronic lending transaction, such as the loan amount, the payback period, and the interest rate. The GUI 720 may display the group member-borrower, the amount of funds received by the group member-borrower, and the transfer date of the funds to the group member-borrower. The GUI 720 may display the group member-lenders (e.g., the guarantors) or the name of the group if the loan is from the group as a whole, the amount of funds transferred by the group member-lenders, and the transfer date of the funds from the group member-lenders. The GUI 720 may display a progress of payback of the electronic lending transaction and/or a status of the electronic lending transaction, such as whether payback is pending or completed. A notification may be transmitted to and displayed by the GUI 720 upon successful payback of the electronic lending transaction.

Figure 7D:
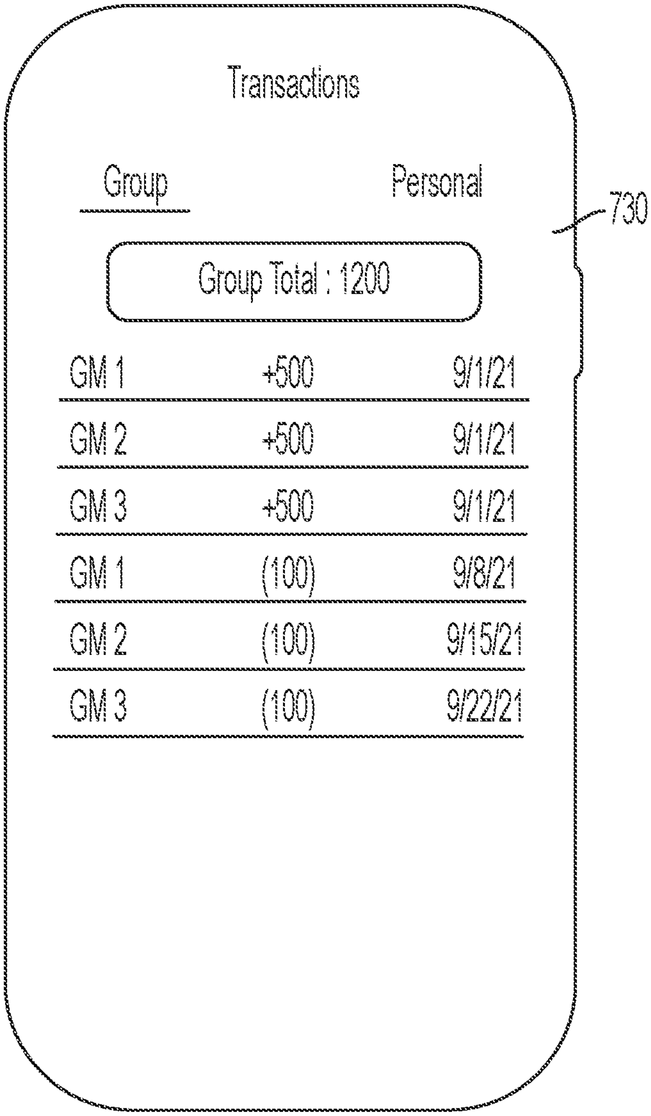
FIG. 7D is an illustration of a graphical user interface of a transaction history function of the group of the mobile application, according to some non-limiting embodiments or aspects.

Referring to FIG. 7D, a GUI 730 of a transaction history function of the group of the mobile application is shown, according to some non-limiting embodiments or aspects. The GUI 730 may display a list and/or a summary of transactions conducted by the group during a time period. For each transaction, the GUI 730 may display at least one of: the group member(s) involved in the transaction, whether the transaction involved a contribution to the group account from a user account or a disbursement from the group account to the user account, a transaction amount, and/or a transaction date. The GUI 730 may display filtered data involving a single other group member or subset of other group members for a time period. It will be appreciated that other ways of filtering the data of the group or other member(s) of the group may be within the scope of the disclosure, such as by filtering based on transaction amount, transaction date, transaction type, and the like.

Figure 7E:
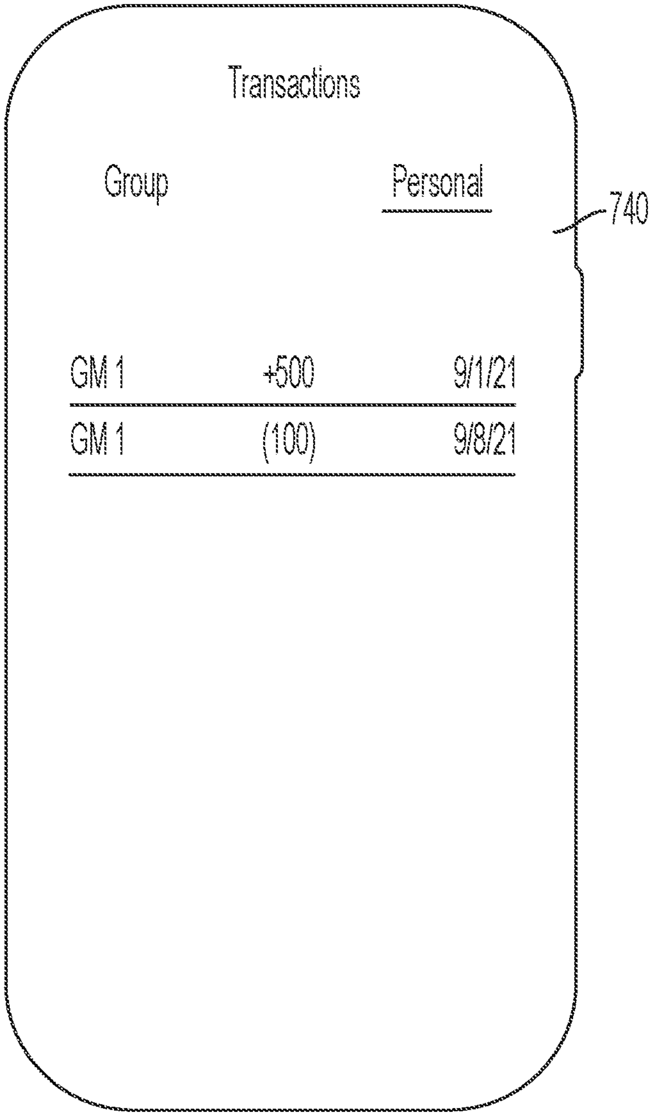
FIG. 7E is an illustration of a graphical user interface of a transaction history function of a group member of the mobile application, according to some non-limiting embodiments or aspects.

Referring to FIG. 7E, a GUI 740 of a transaction history function of a specific group member of the mobile application is shown, according to some non-limiting embodiments or aspects. The GUI 740 may be the same as GUI 730 except filtered to show the transactions involving the specific group member (e.g., group member 1 in FIG. 7E) associated with the user device. It will be appreciated that other ways of filtering the GUI 730 from FIG. 7D for the specific group member associated with the user device may be within the scope of the disclosure, such as by filtering based on transaction amount, transaction date, transaction type, and the like.

Figure 8:
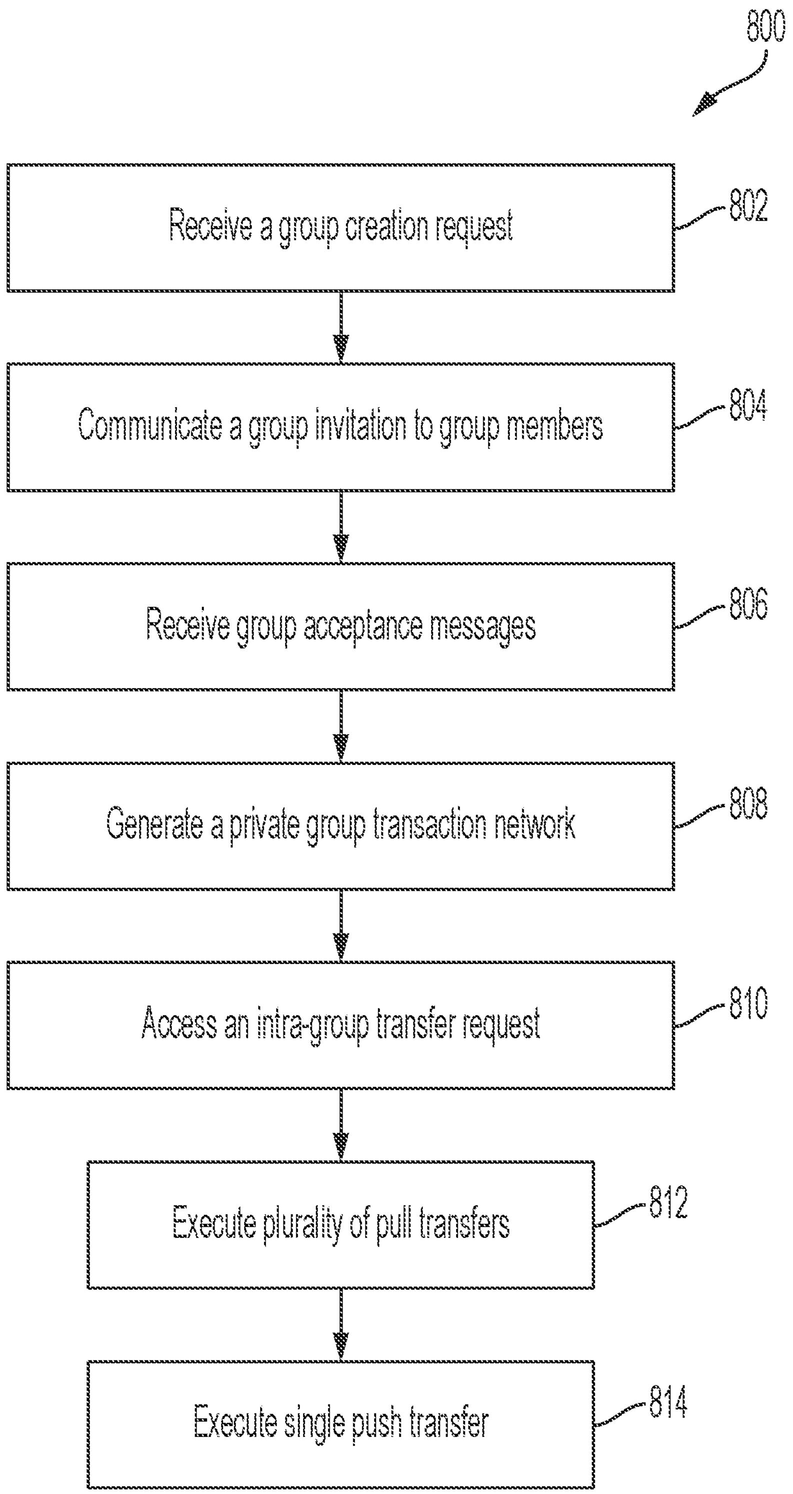
FIG. 8 is a step diagram of a method for operating a private group transaction network, according to some non-limiting embodiments or aspects.

Referring to FIG. 8, a method 800 for operating a private group transaction network is shown, according to some non-limiting embodiments or aspects. At a step 802, the group processor may receive a group creation request to cause generation of a private group transaction network, wherein the group creation request identifies contact information associated with at least three group members. At a step 804, the group processor may communicate a group invitation to each of the at least three group members. At a step 806, the group processor may receive a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system. At a step 808, the group processor may, in response to receiving the plurality of group acceptance messages, generate the private group transaction network comprising the first, second, and third group members, wherein generating the private group transaction network comprises generating a group payment account associated with the private group transaction network, wherein the group payment account is configured in communication with each of the first, second, and third payment accounts.

With continued reference to FIG. 8, at a step 810, the group processor may process an intra-group transfer request between the first and second group members and the third group member for a transfer amount. To process the intra-group transfer request, at a step 812, the group processor may execute a plurality of pull transfers summing at least to the transfer amount by pulling at least the transfer amount from the first and second payment accounts to the group payment account in separate pull transactions. At a step 814, the group processor may execute a single push transfer for the transfer amount by pushing the transfer amount from the group payment account to the third payment account.

Figure 9:
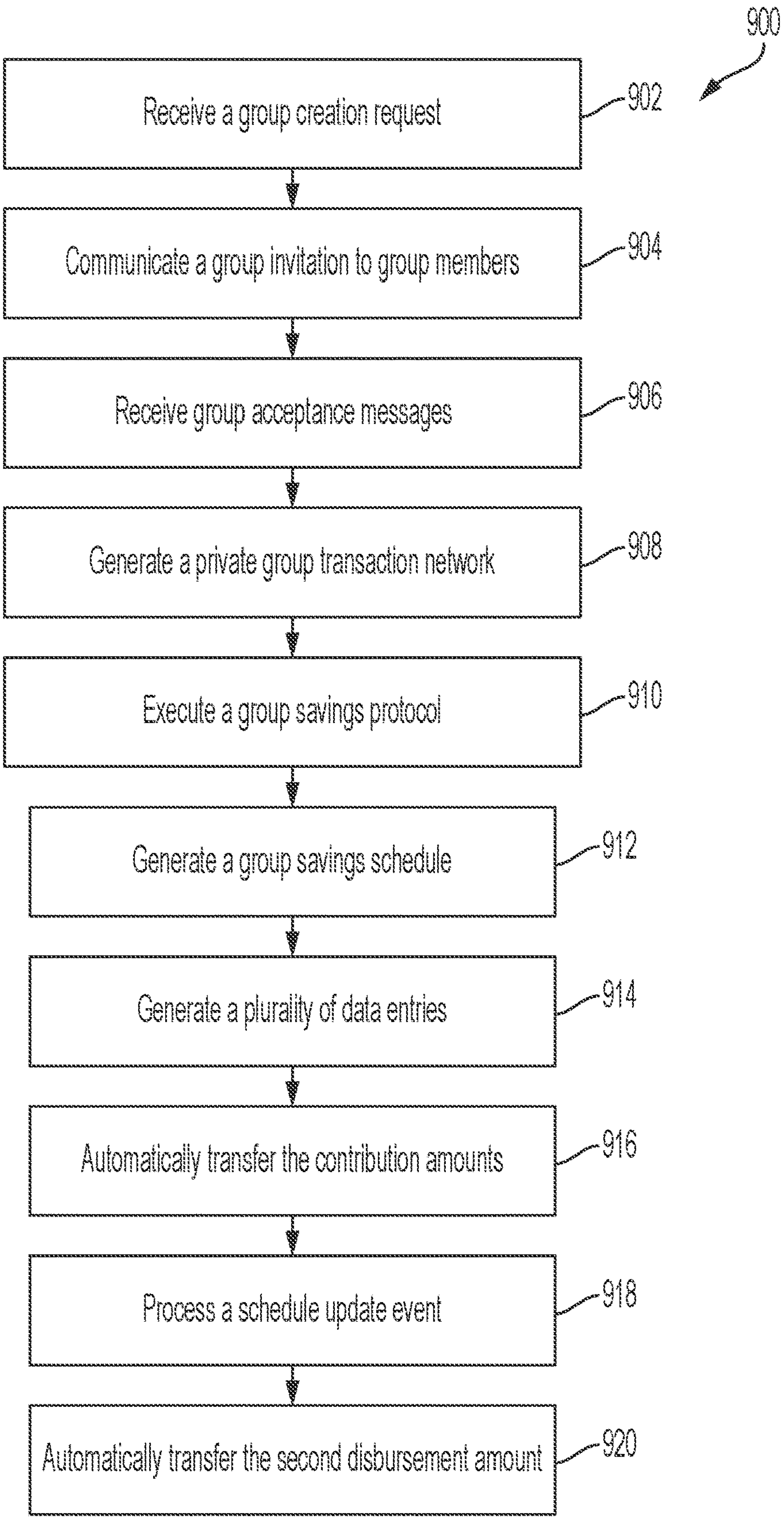
FIG. 9 is a step diagram of a method for operating a private group transaction network, according to some non-limiting embodiments or aspects.

Referring to FIG. 9, a method 900 for operating a private group transaction network is shown, according to some non-limiting embodiments or aspects. At a step 902, the group processor may receive a group creation request to cause generation of a private group transaction network, wherein the group creation request identifies contact information associated with at least three group members. At a step 904, the group processor may communicate a group invitation to each of the at least three group members. At a step 906, the group processor may receive a plurality of group acceptance messages, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system. At a step 908, the group processor may, in response to receiving the plurality of group acceptance messages, generate the private group transaction network comprising the first, second, and third group members, wherein generating the private group transaction network comprises generating a group payment account associated with the private group transaction network, wherein the group payment account is configured in communication with each of the first, second, and third payment accounts.

With continued reference to FIG. 9, at a step 910, the group processor may execute a group savings protocol. Executing the group savings protocol may include, at a step 912, the group processor generating a group savings schedule comprising at least one contribution date on which a contribution amount is pulled from each of the first, second, and third payment accounts to the group payment account and a plurality of disbursement dates comprising: a first disbursement date on which a first disbursement amount is pushed from the group payment account to the first payment account, a second disbursement date on which a second disbursement amount is pushed from the group payment account to the second payment account, and a third disbursement date on which a third disbursement amount is pushed from the group payment account to the third payment account, wherein the first disbursement date, the second disbursement date, and the third disbursement date are different from each other. At a step 914, the group processor may generate and store a plurality of data entries associated with the group savings schedule, the plurality of data entries comprising: a contribution data entry comprising the contribution date, at least one contribution amount, and data associated with the first, second, and third payment accounts; a first disbursement data entry comprising the first disbursement date, the first disbursement amount, and data associated with the first payment account; a second disbursement data entry comprising the second disbursement date, the second disbursement amount, and data associated with the second payment account; and a third disbursement data entry comprising the third disbursement date, the third disbursement amount, and data associated with the third payment account. At a step 916, the group processor may, based on the plurality of data entries, transfer, based on the at least one contribution date, the at least one contribution amount from each of the first, second, and third payment accounts to the group payment account. At a step 918, the group processor may automatically process a schedule update event to exchange the first disbursement date in the first disbursement data entry with the second disbursement date in the second disbursement data entry by modifying the first disbursement data entry and the second disbursement data entry. At a step 920, the group processor may automatically transfer, based on the first disbursement date, the second disbursement amount from the group payment account to the second payment account, based on the modified second disbursement data entry.

In some non-limiting embodiment or aspects, a computer program product for operating a private group transaction network includes at least one non-transitory computer readable medium including program instructions that, when executed by at least one processor, cause the at least one processor to execute one of the previously-described methods. The at least one processor may include any of the components shown in FIGS. 1-9 (e.g., the group processor 106, the user devices 102*a*-102*c*, the issuer systems 104*a*-104*c*, the transaction processing system 218, the payment gateway 502, the payment service system 504, and the like).

Figure 10:
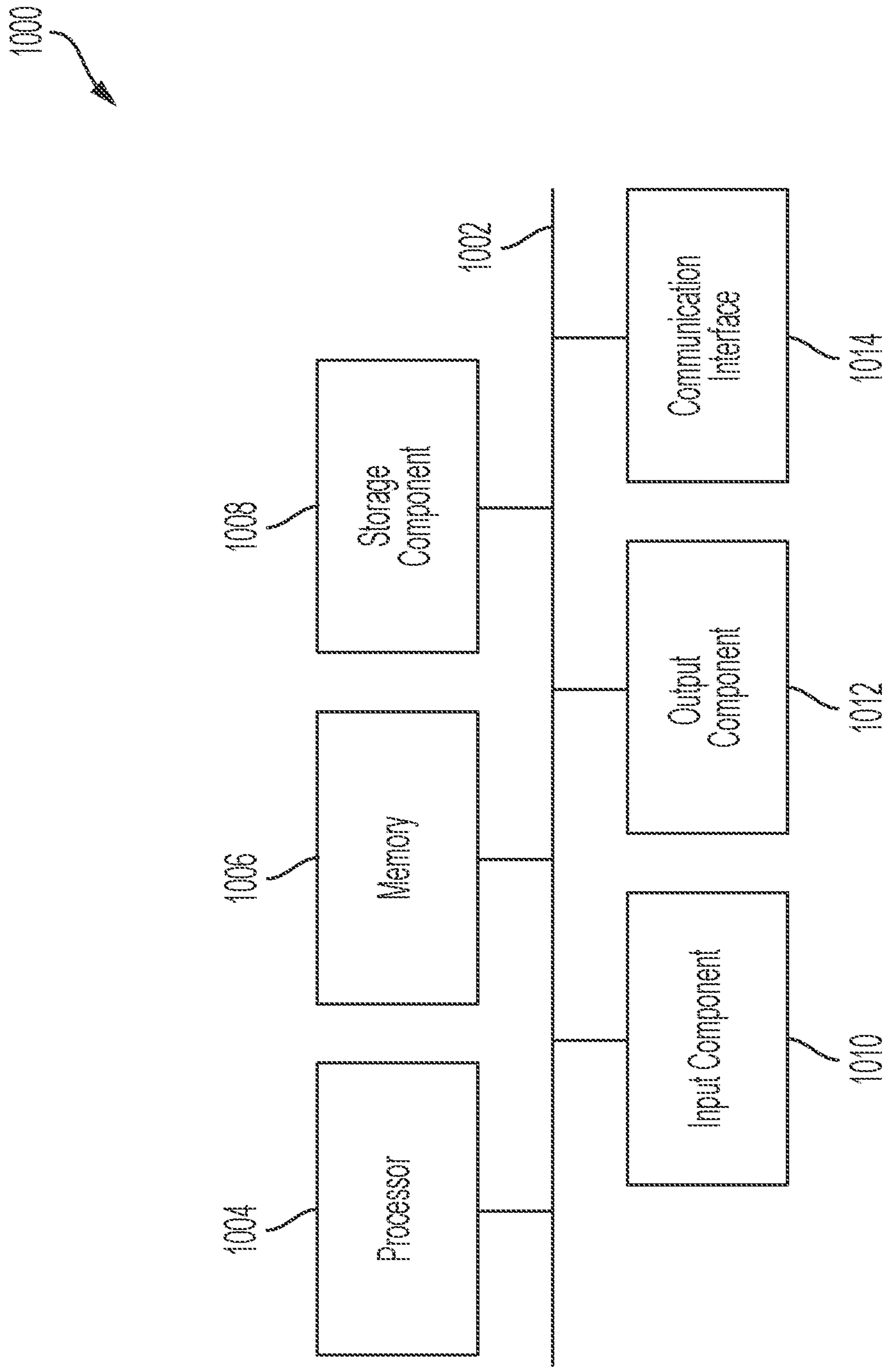
FIG. 10 is a diagram of non-limiting embodiments or aspects of components of one or more devices and/or one or more systems described herein.

Referring to FIG. 10, a diagram is shown of example components of device 1000. Device 1000 may correspond to one or more devices and/or one or more systems described herein. As shown in FIG. 10, device 1000 may include bus 1002, processor 1004, memory 1006, storage component 1008, input component 1010, output component 1012, and communication interface 1014.

Bus 1002 may include a component that permits communication among the components of device 1000. In some non-limiting embodiments, processor 1004 may be implemented in hardware, software, or a combination of hardware and software. For example, processor 1004 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1006 may include random access memory (RAM), read-only memory (ROM), and/or another type of dynamic or static storage device (e.g., flash memory, magnetic memory, optical memory, etc.) that stores information and/or instructions for use by processor 1004.

Storage component 1008 may store information and/or software related to the operation and use of device 1000. For example, storage component 1008 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 1010 may include a component that permits device 1000 to receive information, such as via user input (e.g., a touchscreen display, a keyboard, a keypad, a mouse, a button, a switch, a microphone, a camera, etc.). Additionally or alternatively, input component 1010 may include a sensor for sensing information (e.g., a global positioning system (GPS) component, an accelerometer, a gyroscope, an actuator, etc.). Output component 1012 may include a component that provides output information from device 1000 (e.g., a display, a speaker, one or more light-emitting diodes (LEDs), etc.).

Communication interface 1014 may include a transceiver-like component (e.g., a transceiver, a separate receiver and transmitter, etc.) that enables device 1000 to communicate with other devices, such as via a wired connection, a wireless connection, or a combination of wired and wireless connections. Communication interface 1014 may permit device 1000 to receive information from another device and/or provide information to another device. For example, communication interface 1014 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 1000 may perform one or more processes described herein. Device 1000 may perform these processes based on processor 1004 executing software instructions stored by a computer-readable medium, such as memory 1006 and/or storage component 1008. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 1006 and/or storage component 1008 from another computer-readable medium or from another device via communication interface 1014. When executed, software instructions stored in memory 1006 and/or storage component 1008 may cause processor 1004 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

Memory 1006 and/or storage component 1008 may include data storage or one or more data structures (e.g., a database, and/or the like). Device 1000 may be capable of receiving information from, storing information in, communicating information to, or searching information stored in the data storage or one or more data structures in memory 1006 and/or storage component 1008. For example, the information may include input data, output data, transaction data, account data, or any combination thereof.

Although the above methods, systems, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for operating a private group transaction network, comprising: receiving, with at least one processor, a group creation request to cause generation of a private group transaction network, wherein the group creation request identifies contact information associated with at least three group members associated with at least three user devices; communicating, with at least one processor, a group invitation to each user device of each of the at least three group members, wherein each user device includes a mobile application that includes a registration layer including a backend-for-frontend (BFF) between a services layer that communicates with a transaction processing system to facilitate execution of fund transfers associated with electronic lending transactions and the at least three user devices and at least two issuer systems associated with at least three payment accounts of the at least three group members; receiving, with at least one processor, a plurality of group acceptance messages via the mobile application, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages via the mobile application, generating, with at least one processor, the private group transaction network comprising the first, second, and third group members, wherein generating the private group transaction network comprises generating a group payment account associated with the private group transaction network and onboarding the at least two issuer systems with the private group transaction network such that a group processor may engage with the at least two issuer systems to conduct electronic lending transactions over the private group transaction network, wherein the group payment account is configured in communication with each of the first, second, and third payment accounts, and wherein onboarding the at least two issuer systems includes adding an issuer scheme for each issuer system that causes the BFF of the mobile application to display the mobile application on each user device based on the issuer scheme associated with the issuer system associated with the user account associated with that user device; receiving, with at least one processor, from at least one user device of at least one group member of the at least three group members and a payment gateway associated with the group payment account, via the mobile application, an intra-group transfer request having loan parameters associated with a loan between the first and second group members and the third group member for a transfer amount; and processing, with at least one processor, the intra-group transfer request between the first and second group members and the third group member for the transfer amount by: receiving, with at least one processor, from each user device of each group member of the at least three group members, via the mobile application, an acceptance of the loan parameters associated with the loan, wherein the first, second, and third group members communicate over the private group transaction network via messages sent using the mobile application on the at least three user devices over the private group transaction network to determine and agree upon the loan parameters; in response to receiving the acceptance of the loan parameters from each group member, invoking a smart contract associated with the private group transaction network, wherein the smart contract is associated with predetermined conditions for execution of intra-group transaction requests associated with the private group transaction network; determining whether the intra-group transaction request satisfies the predetermined conditions for execution; in response to determining that the intra-group transaction request satisfies the predetermined conditions for execution, automatically executing, with at least one processor, a plurality of pull transfers summing at least to the transfer amount by pulling at least the transfer amount from the first and second payment accounts to the group payment account in separate pull transactions, wherein executing each of the plurality of pull transfers comprises communicating, via the payment gateway, a separate pull transfer request for each of the first and second payment accounts to a payment service system, wherein the payment service system retrieves the account identifier associated with the respective payment account from a data vault and communicates a transfer request comprising the account identifier to the transaction processing system, and the transaction processing system debits the respective payment account and transfers funds to the group payment account; in response to pulling the at least the transfer amount from the first and second payment accounts to the group payment account, automatically executing, with at least one processor, a single push transfer for the transfer amount by pushing the transfer amount from the group payment account to the third payment account, wherein executing the single push transfer comprises communicating, via the payment gateway, a push transfer request for the third payment account to the payment service system, wherein the payment service system retrieves the account identifier associated with the third payment account from the data vault and communicates a transfer request comprising the account identifier to the transaction processing system, and the transaction processing system transfers the transfer amount from the group payment account to the third payment account; and automatically providing, via the mobile application, to the at least three user devices, transfer data associated with the plurality of pull transfers and the single push transfer.

2. The method of claim 1, further comprising: generating, with at least one processor, a token for each of the received account identifiers; associating, with at least one processor, each generated token with each associated account identifier; and executing, with at least one processor, the plurality of pull transfers and/or the push transfer using the generated tokens.

3. The method of claim 1, further comprising: executing, with at least one processor, a plurality of intra-group transfer requests, each intra-group transfer request executed between at least two of the at least three group members, wherein the plurality of intra-group transfer requests comprise a first intra-group transfer request and a second intra-group transfer request; generating, with at least one processor, first transfer data associated with a first intra-group transfer corresponding to the first intra-group transfer request; generating, with at least one processor, second transfer data associated with a second intra-group transfer corresponding to the second intra-group transfer request; and tracking, with at least one processor, the plurality of intra-group transfer requests using a blockchain based on the first transfer data and the second transfer data.

4. The method of claim 1, wherein at least two of the first payment account, second payment account, and third payment account are based out of different countries.

5. The method of claim 1, wherein the first payment account, second payment account, and third payment account are personal payment accounts.

6. A system for operating a private group transaction network, comprising at least one processor programmed or configured to: receive a group creation request to cause generation of a private group transaction network, wherein the group creation request identifies contact information associated with at least three group members associated with at least three user devices; communicate a group invitation to each user device of each of the at least three group members, wherein each user device includes a mobile application that includes a registration layer including a backend-for-frontend (BFF) between a services layer that communicates with a transaction processing system to facilitate execution of fund transfers associated with electronic lending transactions and the at least three user devices and at least two issuer systems associated with at least three payment accounts of the at least three group members; receive a plurality of group acceptance messages via the mobile application, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages via the mobile application, generate the private group transaction network comprising the first, second, and third group members, wherein generating the private group transaction network comprises generating a group payment account associated with the private group transaction network and onboarding the at least two issuer systems with the private group transaction network such that a group processor may engage with the at least two issuer systems to conduct electronic lending transactions over the private group transaction network, wherein the group payment account is configured in communication with each of the first, second, and third payment accounts, and wherein onboarding the at least two issuer systems includes adding an issuer scheme for each issuer system that causes the BFF of the mobile application to display the mobile application on each user device based on the issuer scheme associated with the issuer system associated with the user account associated with that user device; receive, from at least one user device of at least one group member of the at least three group members and a payment gateway associated with the group payment account, via the mobile application, an intra-group transfer request having loan parameters associated with a loan between the first and second group members and the third group member for a transfer amount; and process the intra-group transfer request between the first and second group members and the third group member for the transfer amount by: receiving, from each user device of each group member of the at least three group members, via the mobile application, an acceptance of the loan parameters associated with the loan, wherein the first, second, and third group members communicate over the private group transaction network via messages sent using the mobile application on the at least three user devices over the private group transaction network to determine and agree upon the loan parameters; in response to receiving the acceptance of the loan parameters from each group member, invoking a smart contract associated with the private group transaction network, wherein the smart contract is associated with predetermined conditions for execution of intra-group transaction requests associated with the private group transaction network; determining whether the intra-group transaction request satisfies the predetermined conditions for execution; in response to determining that the intra-group transaction request satisfies the predetermined conditions for execution, automatically executing a plurality of pull transfers summing at least to the transfer amount by pulling at least the transfer amount from the first and second payment accounts to the group payment account in separate pull transactions, wherein executing each of the plurality of pull transfers comprises communicating, via the payment gateway, a separate pull transfer request for each of the first and second payment accounts to a payment service system, wherein the payment service system retrieves the account identifier associated with the respective payment account from a data vault and communicates a transfer request comprising the account identifier to the transaction processing system, and the transaction processing system debits the respective payment account and transfers funds to the group payment account; in response to pulling the at least the transfer amount from the first and second payment accounts to the group payment account, automatically executing a single push transfer for the transfer amount by pushing the transfer amount from the group payment account to the third payment account, wherein executing the single push transfer comprises communicating, via the payment gateway, a push transfer request for the third payment account to the payment service system, wherein the payment service system retrieves the account identifier associated with the third payment account from the data vault and communicates a transfer request comprising the account identifier to the transaction processing system, and the transaction processing system transfers the transfer amount from the group payment account to the third payment account; and automatically providing, via the mobile application, to the at least three user devices, transfer data associated with the plurality of pull transfers and the single push transfer.

7. The system of claim 6, wherein the at least one processor is programmed or configured to: generate a token for each of the received account identifiers; associate each generated token with each associated account identifier; and execute the plurality of pull transfers and/or the push transfer using the generated tokens.

8. The system of claim 6, wherein the at least one processor is programmed or configured to: execute a plurality of intra-group transfer requests, each intra-group transfer request executed between at least two of the at least three group members, wherein the plurality of intra-group transfer requests comprise a first intra-group transfer request and a second intra-group transfer request; generate first transfer data associated with a first intra-group transfer corresponding to the first intra-group transfer request; generate second transfer data associated with a second intra-group transfer corresponding to the second intra-group transfer request; and track the plurality of intra-group transfer requests using a blockchain based on the first transfer data and the second transfer data.

9. The system of claim 6, wherein at least two of the first payment account, second payment account, and third payment account are based out of different countries.

10. The system of claim 6, wherein the first payment account, second payment account, and third payment account are personal payment accounts.

11. A computer program product for operating a private group transaction network comprising at least one non-transitory computer-readable medium including program instructions that, when executed by at least one processor, cause the at least one processor to: receive a group creation request to cause generation of a private group transaction network, wherein the group creation request identifies contact information associated with at least three group members associated with at least three user devices; communicate a group invitation to each user device of each of the at least three group members, wherein each user device includes a mobile application that includes a registration layer including a backend-for-frontend (BFF) between a services layer that communicates with a transaction processing system to facilitate execution of fund transfers associated with electronic lending transactions and the at least three user devices and at least two issuer systems associated with at least three payment accounts of the at least three group members; receive a plurality of group acceptance messages via the mobile application, one from each of the at least three group members, wherein each group acceptance message comprises an account identifier associated with a payment account of an associated group member, where the at least three group members comprise a first group member having a first payment account issued by a first issuer system, a second group member having a second payment account issued by a second issuer system, and a third group member having a third payment account issued by a third issuer system different from at least one of the first issuer system and the second issuer system; in response to receiving the plurality of group acceptance messages via the mobile application, generate the private group transaction network comprising the first, second, and third group members, wherein generating the private group transaction network comprises generating a group payment account associated with the private group transaction network and onboarding the at least two issuer systems with the private group transaction network such that a group processor may engage with the at least two issuer systems to conduct electronic lending transactions over the private group transaction network, wherein the group payment account is configured in communication with each of the first, second, and third payment accounts, and wherein onboarding the at least two issuer systems includes adding an issuer scheme for each issuer system that causes the BFF of the mobile application to display the mobile application on each user device based on the issuer scheme associated with the issuer system associated with the user account associated with that user device; receive, from at least one user device of at least one group member of the at least three group members and a payment gateway associated with the group payment account, via the mobile application, an intra-group transfer request having loan parameters associated with a loan between the first and second group members and the third group member for a transfer amount; and process the intra-group transfer request between the first and second group members and the third group member for the transfer amount by: receiving, with at least one processor, from each user device of each group member of the at least three group members, via the mobile application, an acceptance of the loan parameters associated with the loan, wherein the first, second, and third group members communicate over the private group transaction network via messages sent using the mobile application on the at least three user devices over the private group transaction network to determine and agree upon the loan parameters; in response to receiving the acceptance of the loan parameters from each group member, invoking a smart contract associated with the private group transaction network, wherein the smart contract is associated with predetermined conditions for execution of intra-group transaction requests associated with the private group transaction network; determining whether the intra-group transaction request satisfies the predetermined conditions for execution; in response to determining that the intra-group transaction request satisfies the predetermined conditions for execution, automatically executing a plurality of pull transfers summing at least to the transfer amount by pulling at least the transfer amount from the first and second payment accounts to the group payment account in separate pull transactions, wherein executing each of the plurality of pull transfers comprises communicating, via the payment gateway, a separate pull transfer request for each of the first and second payment accounts to a payment service system, wherein the payment service system retrieves the account identifier associated with the respective payment account from a data vault and communicates a transfer request comprising the account identifier to the transaction processing system, and the transaction processing system debits the respective payment account and transfers funds to the group payment account; in response to pulling the at least the transfer amount from the first and second payment accounts to the group payment account, automatically executing a single push transfer for the transfer amount by pushing the transfer amount from the group payment account to the third payment account, wherein executing the single push transfer comprises communicating, via the payment gateway, a push transfer request for the third payment account to the payment service system, wherein the payment service system retrieves the account identifier associated with the third payment account from the data vault and communicates a transfer request comprising the account identifier to the transaction processing system, and the transaction processing system transfers the transfer amount from the group payment account to the third payment account; and automatically providing, via the mobile application, to the at least three user devices, transfer data associated with the plurality of pull transfers and the single push transfer.

12. The computer program product of claim 11, wherein the program instructions cause the at least one processor to: generate a token for each of the received account identifiers; associate each generated token with each associated account identifier; and execute the plurality of pull transfers and/or the push transfer using the generated tokens.

13. The computer program product of claim 11, wherein the program instructions cause the at least one processor to: execute a plurality of intra-group transfer requests, each intra-group transfer request executed between at least two of the at least three group members, wherein the plurality of intra-group transfer requests comprise a first intra-group transfer request and a second intra-group transfer request; generate first transfer data associated with a first intra-group transfer corresponding to the first intra-group transfer request; generate second transfer data associated with a second intra-group transfer corresponding to the second intra-group transfer request; and track the plurality of intra-group transfer requests using a blockchain based on the first transfer data and the second transfer data.

14. The computer program product of claim 11, wherein at least two of the first payment account, second payment account, and third payment account are based out of different countries.

15. The computer program product of claim 11, wherein the first payment account, second payment account, and third payment account are personal payment accounts.

* * * * *